US012401756B2

(12) United States Patent
Bryan et al.

(10) Patent No.: US 12,401,756 B2
(45) Date of Patent: Aug. 26, 2025

(54) GENERATING A COMPOSITE VIDEO STREAM HAVING DIGITAL CONTENT AND A PARTICIPANT VIDEO FOR REAL-TIME PRESENTATION IN A USER INTERFACE OF A VIDEO CONFERENCE SYSTEM

(71) Applicant: Google LLC, Mountain View, CA (US)

(72) Inventors: Kathleen Alexandra Bryan, Mountain View, CA (US); Shiblee Imtiaz Hasan, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 18/196,588

(22) Filed: May 12, 2023

(65) Prior Publication Data

US 2024/0380859 A1    Nov. 14, 2024

(51) Int. Cl.
*H04N 5/262* (2006.01)
*G06T 5/70* (2024.01)
*G06T 5/94* (2024.01)
*G06T 7/11* (2017.01)
*H04N 5/272* (2006.01)

(52) U.S. Cl.
CPC ............ *H04N 5/2624* (2013.01); *G06T 5/70* (2024.01); *G06T 5/94* (2024.01); *G06T 7/11* (2017.01); *H04N 5/272* (2013.01); *G06T 2200/24* (2013.01); *G06T 2207/10016* (2013.01); *G06T 2207/30196* (2013.01)

(58) Field of Classification Search
CPC ...... H04N 5/2624; H04N 5/272; H04N 5/262; G06T 7/11; G06T 5/94; G06T 5/70
See application file for complete search history.

(56) References Cited

U.S. PATENT DOCUMENTS

| 9,992,450 | B1* | 6/2018 | Yuan .................. G06F 18/2321 |
| 11,412,180 | B1* | 8/2022 | Mayfield ................ H04N 7/15 |
| 11,825,237 | B1* | 11/2023 | Agrawal ............... G06F 3/0488 |

(Continued)

FOREIGN PATENT DOCUMENTS

WO    2022251257 A1    12/2022

OTHER PUBLICATIONS

International Search Report and Written Opinion for International Application No. PCT/US2024/28415, mailed Sep. 17, 2024, 15 pages.

(Continued)

*Primary Examiner* — Olisa Anwah
(74) *Attorney, Agent, or Firm* — Lowenstein Sandler LLP

(57) ABSTRACT

A first event associated with a first client device of multiple client devices of participants of a video conference is identified. The first event indicates a request to present content in a user interface (UI) including regions each corresponding to one of multiple video streams from the client devices. A first video layer that includes a reframed visual representation of the first participant is generated from the first video segment of a first video stream from the first client device. A first content layer is generated. The first video layer and the first content layer are composited into the first composite video segment in which the reframed visual representation of the first participant is positioned adjacent to the first part of the content. The first composite video segment is provided to the client devices as a real-time video stream for presentation.

20 Claims, 14 Drawing Sheets

(56) References Cited

U.S. PATENT DOCUMENTS

| | | | | |
|---|---|---|---|---|
| 2012/0092438 A1* | 4/2012 | Guzman Suarez | ...... | H04N 7/15 348/E7.083 |
| 2013/0314421 A1 | 11/2013 | Kim | | |
| 2023/0306610 A1* | 9/2023 | Nicholson | ................. | G06T 5/50 |
| 2024/0031416 A1* | 1/2024 | van Rensburg | ..... | H04L 65/4015 |
| 2024/0040073 A1* | 2/2024 | Chang | .................... | G06V 10/26 |
| 2024/0223727 A1* | 7/2024 | Jain | ........................ | H04N 7/152 |

OTHER PUBLICATIONS

Mehta K., "Now in Public Preview: Presenter Modes: Controls to Move and Resize Presenter Video," Microsoft, Mar. 30, 2022, 1 Page, Retrieved from [https://techcommunity.microsoft.com/t5 /forums/ forumtopicprintpage/board-id/Micro softTeamsPublicPreview/ message-id/667/print-single-message/true/].

Microsoft Teams: "Bibliographic Information for How to Use Presenter Modes in Microsoft Teams Meetings," Apr. 11, 2023, 2 Pages, Retrieved from [https://www.youtube.com/watch7v= RQ70N8u3QD8].

Thompson M., "Side-by-side and Reporter Presenter Modes with Desktop and Window Sharing," Super Simple 365, Apr. 30, 2022 Retrieved from the Internet: URL:https://supersimple365.com/side-by-sid e-and-reporter-presenter-modes-with-desktop-and-window-sharing/, pp. 1-3.

\* cited by examiner

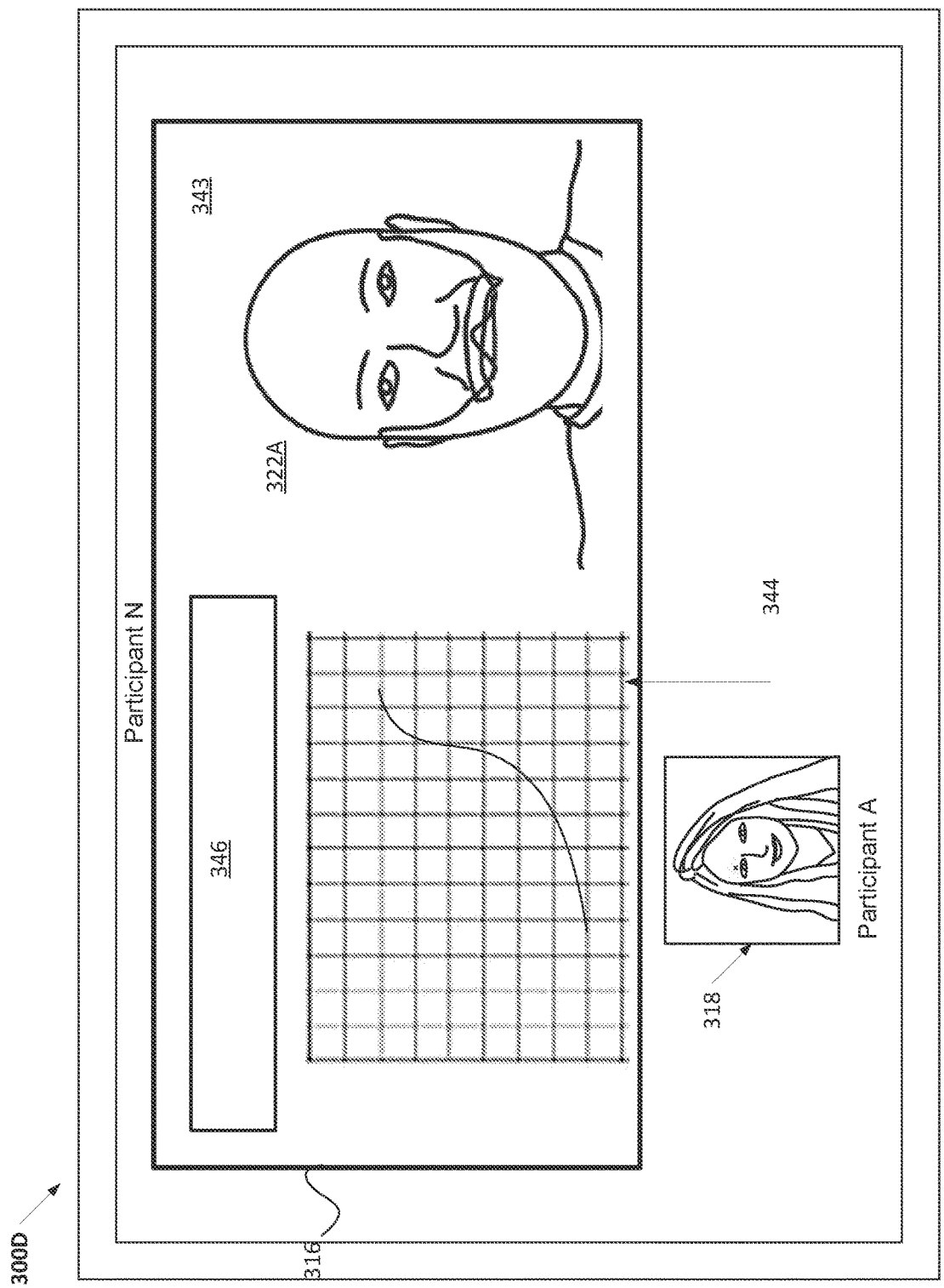

GENERATING A COMPOSITE VIDEO STREAM HAVING DIGITAL CONTENT AND A PARTICIPANT VIDEO FOR REAL-TIME PRESENTATION IN A USER INTERFACE OF A VIDEO CONFERENCE SYSTEM

FIELD OF THE INVENTION

Aspects and embodiments of the disclosure relate to a user interface of a video conference, and in more specifically, to generating a composite video stream having digital content and a participant video for real-time presentation in a user interface of a video conference.

BACKGROUND

Video conferences can take place between multiple participants via a video conference platform. A video conference platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the video conference platform can provide a user interface that includes multiple regions to display the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method including identifying a first event associated with a first client device of a plurality of client devices of a plurality of participants of a video conference, the first event indicating a request to present content in a user interface (UI) comprising a plurality of regions each corresponding to one of a plurality of video streams from the plurality of client devices; responsive to identifying the first event, generating a first composite video segment based on a first video segment of a first video stream from the first client device, wherein generating the first composite video segment comprises: generating, from the first video segment, a first video layer of a plurality of layers, the first video layer comprising a reframed visual representation of a first participant corresponding to the first client device; generating a first content layer of the plurality of layers, the first content layer comprising a first part of the content; and compositing the first video layer and the first content layer into the first composite video segment in which the reframed visual representation of the first participant is positioned adjacent to the first part of the content; and providing, to the plurality of client devices, the first composite video segment as a real-time video stream for presentation within respective regions of the plurality of regions of respective instances of the UI.

In some embodiments, generating, from the first video segment, the first video layer of the plurality of layers, further comprises: cropping a visual representation of the first participant from first frames of the first video segment; and reframing the visual representation of the first participant to generate the reframed visual representation of the first participant, wherein reframing the visual representation of the first participant comprises modifying a location of the cropped visual representation of the first participant in the first video layer relative to a location of a visual representation of the first participant in the first video segment.

In some embodiments, generating the first composite video segment based on the first video segment received from the first client device, further comprising: generating a first background layer of the plurality of layers, wherein the first background layer is different than an original background of the first video segment, wherein the plurality of layer are composited into the first composite video segment.

In some embodiments, generating the first background layer of the plurality of layers, comprises: analyzing features of the original background; generating an additional background portion based on the analysis of the features; and merging a portion of the original background with the additional background portion.

In some embodiments, generating the first background layer of the plurality of layers, further comprising performing a pixel blur operation on at least the additional background portion of the first background layer, the pixel blur operation to blur areas of the first background layer above which the first part of the content is composited.

In some embodiments, the method includes adjusting features of the first part of the content to increase contrast between the first part of the content and the first background layer.

In some embodiments, generating the first content layer, comprises: receiving, from the first client device, data identifying the first part of the content displayed at the first client device; and generating the first content layer including the first part of the content using the data.

In some embodiments, generating the first content layer, comprises: receiving, from the first client device, a first data file in a first format, the first data file comprising the content; encoding the content from the first format to a second format; and generating the first content layer using the first part of the content in the second format.

In some embodiments, the method includes identifying a second event associated with the first client device of the plurality of client devices of the plurality of participants of the video conference, the second event indicating a relocation of a visual representation of the first participant in the first video stream of the plurality of video streams; responsive to identifying the second event, generating a second composite video segment based on a second video segment received from the first client device, wherein generating the second composite video segment comprises: generating, from the second video segment, a second video layer comprising a second reframed visual representation of the first participant; generating a second content layer comprising the first part of the content; generating a second background layer that is different than the first background layer; and compositing the second video layer, the second content layer and the second background layer into the second composite video segment; and providing, to the plurality of client devices, the second composite video segment as the real-time video stream for presentation within the respective regions of the plurality of regions of the respective instances of the UI.

In some embodiments, the method includes identifying a third event associated with the first client device of the plurality of client devices of the plurality of participants of the video conference, the third event indicating a request to present a second part of the content; responsive to identifying the third event, generating a third composite video segment based on a third video segment received from the first client device, wherein generating the third composite video segment comprises: generating, from the third video segment, a third video layer comprising a third reframed visual representation of the first participant; generating a third content layer comprising the second part of the content; and compositing the third video layer and the third content layer into the third composite video segment in which the reframed third visual representation of the first participant is positioned adjacent to the second part of the content; and providing, to the plurality of client devices, the third composite video segment as the real-time video stream for presentation within the respective regions of the plurality of regions of the respective instances of the UI.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding only.

FIG. 3I illustrates an example user interface having a composite video segment for a video conference, in accordance with some embodiments of the disclosure.

DETAILED DESCRIPTION

Figure 1:
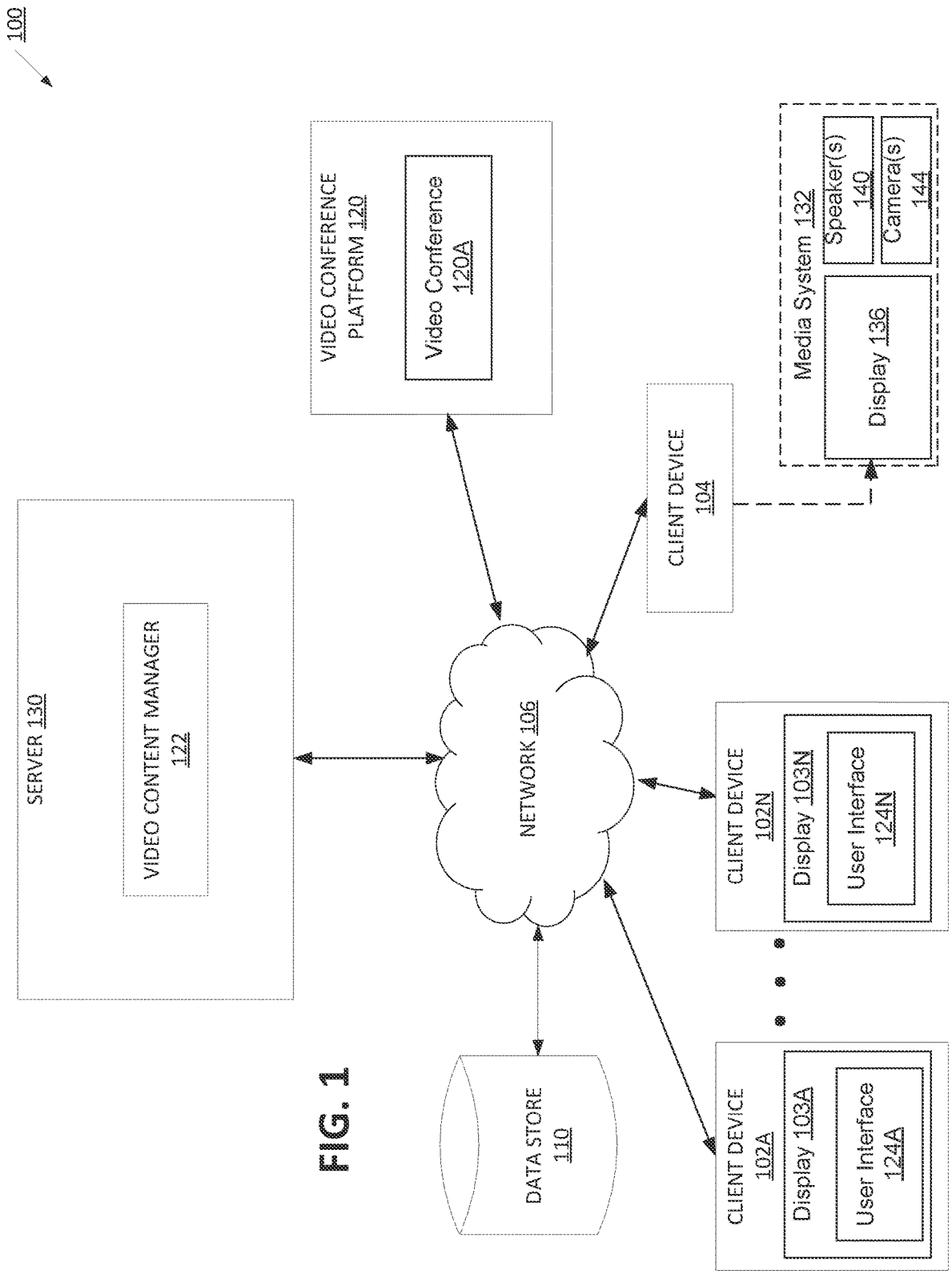
FIG. 1 illustrates an example system architecture, in accordance with embodiments of the disclosure.

Aspects of the disclosure relate to providing a composite video segment of a video stream that includes digital content and video of a participant in a user interface (UI) of a video conference platform for real-time presentation. A video conference platform can enable video-based conferences between multiple participants via respective client devices that are connected over a network and share each other's audio data (e.g., voice of a user recorded via a microphone of a client device) and/or video data (e.g., a video captured by a camera of a client device) during a video conference. In some instances, a video conference platform can enable a significant number of client devices (e.g., up to one hundred or more client devices) to be connected via the video conference.

A participant of a video conference can speak (e.g., present on a topic) to the other participants of the video conference. Some existing video conference platforms can provide a user interface (UI) to each client device connected to the video conference. The UI displays the video streams from the client devices over the network in a set of regions in the UI. For example, the video stream of a participant who is speaking to the other participants in the video conference can be displayed in a designated, often larger, region of the UI of the video conference platform, and the video streams of other participants who are not speaking can be displayed in other, often smaller, regions.

Some video conference systems allow a participant to share a screen of a local display with the other participants of the video conference. The local display can display content (e.g., document, webpage, graphical user interface (GUI), etc.) that can be shared with the participants of the video conference via the UI. However, sharing content in this manner often requires the participants to follow two different video streams in different regions of the UI, where one video stream presents the participant and the other video stream presents the digital content.

Aspects of the disclosure address the above and other deficiencies by providing a composite video stream (e.g., that can include one or more composite video segments) that integrates multiple digital objects, such as digital content (herein after referred to as "content") with video of the participant.

In some embodiments, a participant can request to present content in a video conference UI that includes multiple regions. Each region can include a visual item, such as a video stream from a client device of a respective participant of the video conference. Multiple modalities can be used to request content in the video conference UI, including but not limited to, keyboard input, mouse input, a voice command, a UI element of the video conference UI, or a video gesture. A video gesture can refer to a physical movement, action, or physical orientation made by a participant that is captured on video. For example, a participant may make a video gesture such as pointing an index finger. A computer vision operation can be performed on video frames of the participant's video stream (e.g., a video stream from the participant's client device). A computer vision operation can include one or more operations that interpret visual data (e.g., video data such as a video segment including multiple frames). To interpret visual data, the computer vision operation can use the visual data to identify and/or classify objects (e.g., machine learning classification) in the video. The identified or classified object(s) can be interpreted as a predetermined video gesture that indicates some information, such as a request to present content in the video UI.

Responsive to the request to present content in the video conference UI, the video conference system can generate a composite video segment based on a video segment received from the client device of the requesting participant. Generating the composite video segment can include generating a first video layer by cropping a visual representation of the participant from the video segment and reframing the visual representation of the participant in the video layer. The video conference system can generate a background layer that is different than the original background layer of the video segment (e.g., to improve cohesiveness of the background modified by the reframing and to improve contrast between the background and the foreground content for better visibility of the foreground content). The video conference system can generate a content layer that includes at least a first part of the content identified by the requesting participant. The video conference system can composite the various layers into the composite video segment to form a unified video output where the reframed visual representation of the participant is positioned adjacent to the first part of the content.

In some embodiments, to generate the background layer, the video conference system can use a portion of the original background and generate a portion of an additional background that includes similar features (e.g., textures, colors, and/or lighting) to the original background. The video conference system can merge the portion of the original background with the portion of the additional background to generate the background layer.

In some embodiments, the content can include information from a screen-share of a local display of a participant's client device. The local display can display content (e.g., document, webpage, graphical user interface (GUI), etc.) that is captured in a video that is sent from the client device to the video conference system. In some embodiments, the content can include information (e.g., text) from a document file received by the video conference system.

In some embodiments, the participant can request to present another part of the content. For example, the participant can request to scroll the document up or down, or request that a new slide of a slide presentation be presented. Responsive to receiving the request to present another part of the content, the video conference system can generate a new composite video segment that presents the second part of the content.

In some embodiments, the participant can move locations within the video segment. Video conference system can identify the participant's change in location (e.g., via a computer vision operation) and generate a new composite video segment that "swaps" the positions of the participant and the content relative to the positions in the previous composite video segment.

Aspects of the disclosure provide technical advantages over previous solutions. Aspects of the disclosure can provide additional functionality to the video conference tool of the video conference platform that intelligently brings composite video segments with multiple video objects, such as content and video of the participant, for real-time presentation in a video conference. Such additional functionality can also result in more efficient use of processing resources utilized to facilitate the sharing of content between client devices by avoiding consumption of computing resources needed to support participants and/or hosts using collaboration applications outside of the video conference environment or rendering multiple video streams to present content and the corresponding participant separately, thereby resulting in an increase of overall efficiency and functionality of the video conference platform.

In some embodiments, a video stream includes multiple frames that can be arranged in a temporal order using timestamps. A video stream (e.g., received video stream) can be received from a client device. The received video stream can be processed and transmitted (e.g., transmitted video stream) to the client device for presentation during a video conference. In some embodiments, a video stream can include multiple video segments, where a video segment is a portion of a video stream. A video segment can include video frames (e.g., a subset of the video frames of the video stream). The video frames of a video segment can be arranged in a temporal order using timestamps. A video stream or video segment can include one or more layers (e.g., video layers) that are composited together (e.g., positioned and/or layered on top of one another in a specified order) to form a unified video output. For example, a foreground layer and background layer can be composited together to form a video stream or video segment. In some embodiments, each layer can include one or more frames (e.g., multiple frames). When a frame of a particular layer is composited with a frame of another layer, a unified frame (e.g., single frame) can be generated. A composite video segment can be a video segment generated by compositing multiple layers to form a unified video output. A composite video stream can include one or more composite video segments.

FIG. 1 illustrates an example system architecture 100, in accordance with embodiments of the disclosure. The system architecture 100 (also referred to as "system" herein) includes client devices 102A-N, one or more client devices 104, a data store 110, a video conference platform 120, and a server 130, each connected to a network 106.

In embodiments, network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some embodiments, data store 110 can be a network-attached file server, while in other embodiments data store 110 can be some other type of persistent storage such as an object-oriented database, a relational database, and so forth, that may be hosted by video conference platform 120 or one or more different machines (e.g., the server 130) coupled to the video conference platform 120 via network 106. In some embodiments, the data store 110 can store portions of audio and video streams received from the client devices 102A-102N for the video conference platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users.

Video conference platform 120 can enable users of client devices 102A-102N and/or client device(s) 104 to connect with each other via a video conference (e.g., a video conference 120A). A video conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. For example, in a real-time communication of an event, such as a video conference, segments of the video streams of the video conference are sent to participating client devices before the event has concluded (e.g., while the event is ongoing). Video conference platform 120 can allow a user to join and participate in a video conference call with other users of the platform. Embodiments of the disclosure can be implemented with any number of participants connecting via the video conference (e.g., up to one hundred or more).

The client devices 102A-102N may each include computing devices such as personal computers (PCs), laptops, mobile phones, smart phones, tablet computers, netbook computers, network-connected televisions, etc. In some embodiments, client devices 102A-102N may also be referred to as "user devices." Each client device 102A-102N can include an audiovisual component that can generate audio and video data to be streamed to video conference platform 120. In some embodiments, the audiovisual component can include a device (e.g., a microphone) to capture an audio signal representing speech of a user and generate audio data (e.g., an audio file or audio stream) based on the captured audio signal. The audiovisual component can include another device (e.g., a speaker) to output audio data to a user associated with a particular client device 102A-102N. In some embodiments, the audiovisual component can also include an image capture device (e.g., a camera) to capture images and generate video data (e.g., a video stream) of the captured data of the captured images.

In some embodiments, video conference platform 120 is coupled, via network 106, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 106). Users that are physically present in the room can use media system 132 rather than their own devices (e.g., client devices 102A-102N) to participate in a video conference, which may include other remote users. For example, the users in the room that participate in the video conference may control the display devices 136 to show a slide presentation or watch slide presentations of other participants. Sound and/or camera control can similarly be performed. Similar to client devices 102A-102N, client device(s) 104 can generate audio and video data to be streamed to video conference platform 120 (e.g., using one or more microphones, speakers 140 and cameras 144).

Each client device 102A-102N or 104 can include a web browser and/or a client application (e.g., a mobile application, a desktop application, etc.). In some embodiments, the web browser and/or the client application can present, on a display device 103A-103N of client device 102A-102N, a user interface (UI) (e.g., a UI of the UIs 124A-124N) for users to access video conference platform 120. For example, a user of client device 102A can join and participate in a video conference via a UI 124A presented on the display device 103A by the web browser or client application. A user can also present a document to participants of the video conference via each of the UIs 124A-124N. Each of the UIs 124A-124N can include multiple regions to present visual items corresponding to video streams of the client devices 102A-102N provided to the server 130 for the video conference.

In some embodiments, server 130 can include a video content manager 122. Video content manager 122 is configured to manage a video conference between multiple users of video conference platform 120. In some embodiments, video content manager 122 can provide the UIs 124A-124N to each client device to enable users to watch and listen to each other during a video conference. Video content manager 122 can also collect and provide data associated with the video conference to each participant of the video conference. In some embodiments, video content manager 122 can provide the UIs 124A-124N for presentation by a client application (e.g., a mobile application, a desktop application, etc.). For example, the UIs 124A-124N can be displayed on a display device 103A-103N by a native application executing on the operating system of the client device 120A-120N or the client device 104. The native application may be separate from a web browser. In some embodiments, the video content manager 122 can determine visual items for presentation in the UI 124A-124N during a video conference. A visual item can refer to a UI element that occupies a particular region in the UI and can present at least a video stream from a respective client device. Such a video stream can depict, for example, a user of the respective client device while the user is participating in the video conference (e.g., speaking, presenting, listening to other participants, watching other participants, etc., at particular moments during the video conference), a physical conference or meeting room (e.g., with one or more participants present), a document or media content (e.g., video content, one or more images, etc.) being presented during the video conference, a virtual whiteboard, a combination thereof, etc. For example, video content manager 122 can identify an event associated with a first client device of multiple client devices of participants of a video conference. The first event can indicate a request to present content within the UI of the video conference. Responsive to identifying a first event indicating a request to present content within the UI of the video conference, video content manager 122 can generate a first composite video segment based on a first video segment of a first video stream received from the first client device. To generate the first composite video segment, video content manager 122 generates a first video layer of multiple layers. To generate the first video layer, video content manager 122 can reframe the visual representation of the first participant corresponding to the first client device. To generate the first composite video segment, video content manager 122 can also generate a first content layer of multiple layers. The first content layer can include at least a first part of the content. Video content manager 122 can composite the multiple layers into the first composite video segment in which the reframed visual representation of the first participant is positioned adjacent to the first part of the content. Video content manager 122 provides the first composite video segment to the client devices of the video conference as a real-time video stream for presentation within respective regions of respective instances of the UI.

As described previously, an audiovisual component of each client device can capture images and generate video data (e.g., a video stream) of the captured data of the captured images. In some embodiments, the client devices 102A-102N and/or client device(s) 104 can transmit the generated video stream to video content manager 122. The audiovisual component of each client device can also capture an audio signal representing speech of a user and generate audio data (e.g., an audio file or audio stream) based on the captured audio signal. In some embodiments, the client devices 102A-102N and/or client device(s) 104 can transmit the generated audio data to video content manager 122.

In some embodiments, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a video conference. Video conference platform 120 may also include a website (e.g., a webpage) or application back-end software that may be used to enable a user to connect with other users via the video conference.

It should be noted that in some other embodiments, the functions of server 130 or video conference platform 120 may be provided by a fewer number of machines. For example, in some embodiments, server 130 may be integrated into a single machine, while in other embodiments, server 130 may be integrated into multiple machines. In addition, in some embodiments, server 130 may be integrated into video conference platform 120.

In general, functions described in embodiments as being performed by video conference platform 120 or server 130 can also be performed by the client devices 102A-N and/or client device(s) 104 in other embodiments, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

Although embodiments of the disclosure are discussed in terms of video conference platform 120 and users of video conference platform 120 participating in a video conference, embodiments may also be generally applied to any type of telephone call or conference call between users. Embodiments of the disclosure are not limited to video conference platforms that provide video conference tools to users.

In embodiments of the disclosure, a "user" may be represented as a single individual. However, other embodiments of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the video conference platform 120.

In situations in which the systems discussed here collect personal information about users, or may make use of personal information, the users may be provided with an opportunity to control whether video conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video conference platform 120 and/or server 130.

Figure 2:
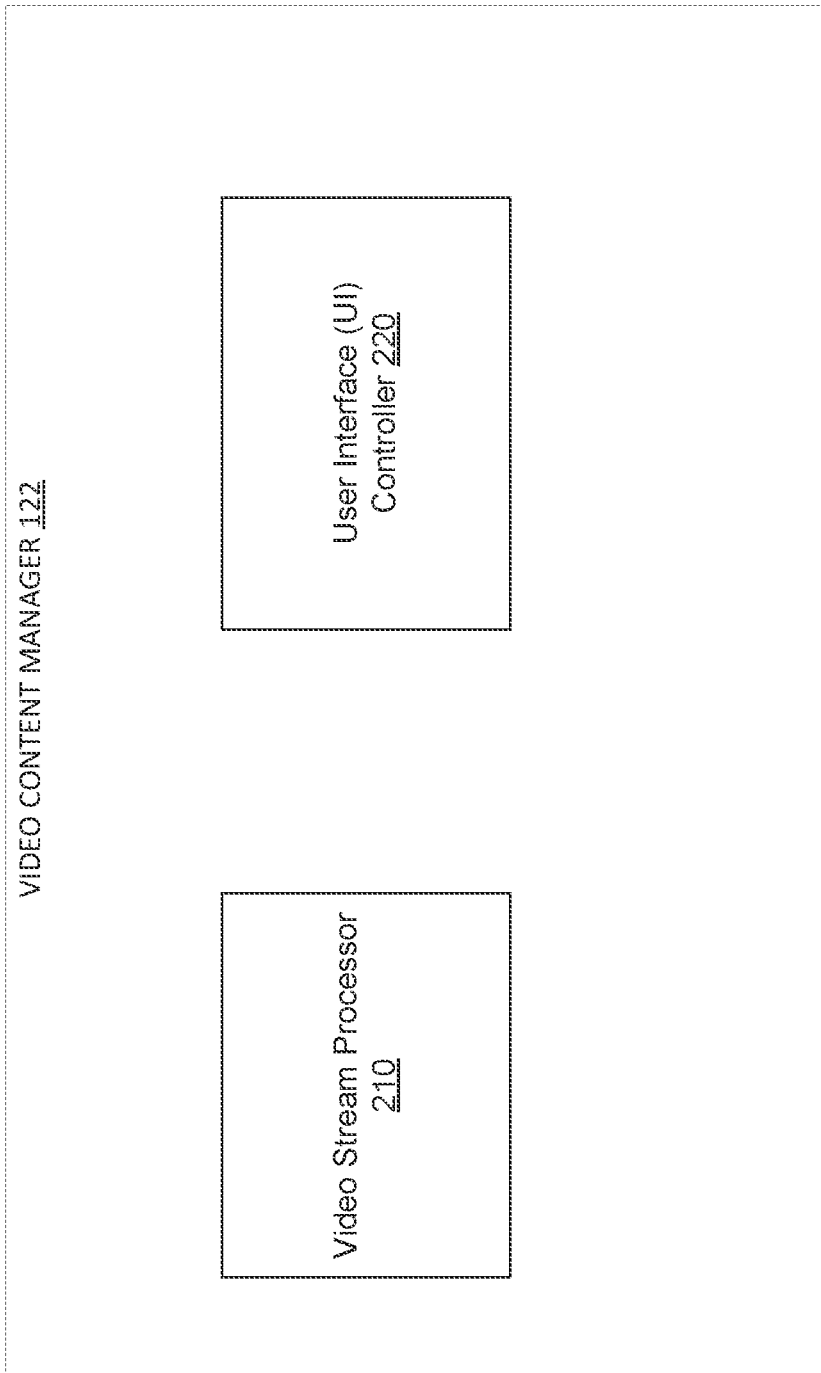
FIG. 2 is a block diagram illustrating an example video content manager, in accordance with embodiments of the disclosure.

FIG. 2 is a block diagram illustrating an example video content manager 122, in accordance with embodiments of the disclosure. The video content manager 122 includes a video stream processor 210 and a user interface (UI) controller 220. The components can be combined together or separated into further components, according to a particular embodiment. It should be noted that in some embodiments, various components of the video content manager 122 may run on separate machines.

The video stream processor 210 can receive video streams from the client devices (e.g., from client devices 102A-102N and/or 104). The video stream processor 210 can determine visual items for presentation in the UI (e.g., the UIs 124A-124N) during a video conference. Each visual item can at least correspond to a video stream from a client device (e.g., the video stream pertaining to one or more participants of the video conference). In some embodiments, a visual item can correspond to both a video stream from a client device and content to be presented in the UI of the video conference. In some embodiments, the video stream processor 210 can receive audio streams associated with the video streams from the client devices (e.g., from an audiovisual component of the client devices 102A-102N). Once the video stream processor has determined visual items for presentation in the UI, the video stream processor 210 can notify the UI controller 220 of the determined visual items.

The UI controller 220 can provide the UI for a video conference. The UI can include multiple regions. In some embodiments, one or more regions can display a video stream pertaining to one or more participants (e.g., users) of the video conference. In some embodiments, a region can content along with a video stream pertaining to one or more participants of the video conference. In some embodiments, the content can be implemented within a video stream pertaining to one or more participants of the video conference (e.g., as a background layer of the video stream). The UI controller 220 can control which video stream is to be displayed by providing a command to the client devices that indicates which video stream is to be displayed in which region of the UI (along with the received video and audio streams being provided to the client devices). For example, in response to being notified of the determined visual items for presentation in the UI 124A-124N, the UI controller 220 can transmit a command causing each determined visual item to be displayed in a region of the UI and/or rearranged in the UI.

Figure 3A:
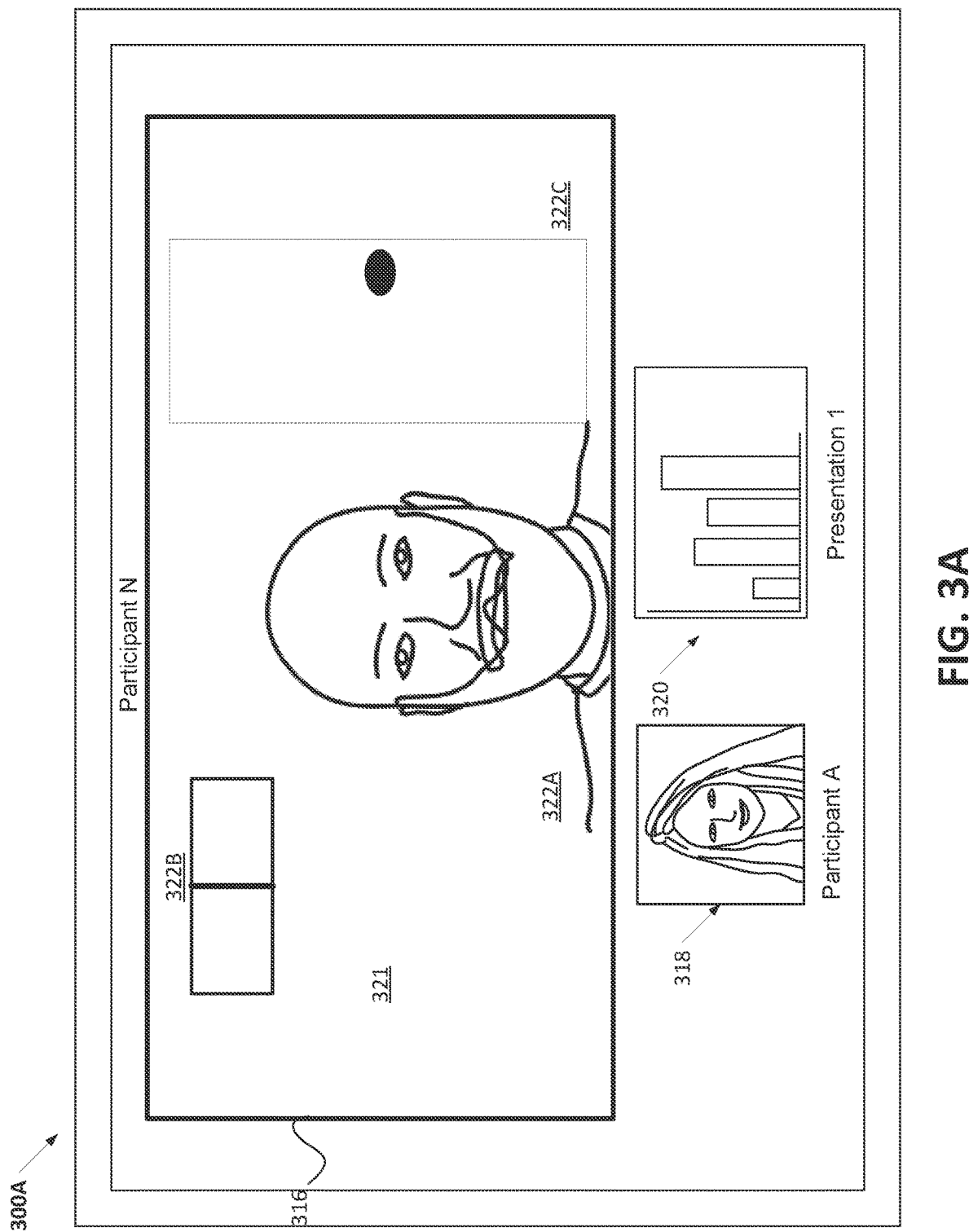
FIG. 3A illustrates an example user interface for a video conference, in accordance with some embodiments of the disclosure.

FIG. 3A illustrates an example user interface 300A for a video conference, in accordance with some embodiments of the disclosure. UI 300A through UI 300D are generally referred to as UI 300. The UI 300 can be generated by the video content manager 122 of FIG. 1 for presentation at one or more client devices (e.g., client devices 102A-102N and/or 104). Accordingly, the UI 300 can be generated by one or more processing devices of the server 130 of FIG. 1. In some embodiments, the video conference between multiple participants can be managed by the video conference platform 120. As illustrated, the video content manager 122 can provide the UI 300 to enable participants (e.g., participants A-N) to join and participate in the video conference.

UI 300A can include multiple regions, such as a first region 316, a second region 318, and a third region 320. The first region 316 can display a visual item corresponding to video data captured and/or streamed by a client device associated with Participant N. As illustrated, visual item 321 includes the video stream of participant N. The visual item 321 can include video object 322A, video object 322B, and video object 322B (generally referred to as "video objects 322" herein). For example, video object 322A illustrates a video stream of Participant N. Video object 322B illustrates a window in the background and video object 322C illustrates a door in the background. Second region 318 can display a visual item corresponding to video data captured and/or streamed by a client device associated with Participant A.

Third region 320 can display a visual item corresponding to video data (e.g., a video stream) of a document being presented. A document can be a slide presentation, a word processing document, a spreadsheet document, a web page, or any other document that can be presented. In one embodiment, a client device can open (e.g., in response to a user operation) a document on the screen using an appropriate document application and share (e.g., in response to a user operation) the screen presenting the document with client devices of the other participants by providing a video stream of the document. In the present example, the document is being shared by participant N. In some embodiments, the document includes a collaborative document where one or more participants can modify, and in some cases concurrently, information (e.g., text) of the collaborative for real-time presentation.

As illustrated, the first region 316 can correspond to a "main region," e.g., an area in the UI 300A that is placed at or near the center or a focus area of the UI 300A. In some embodiments, the second region 318 and the third region 320 can correspond to "thumbnail regions." A thumbnail region can refer to an area of the UI 300A that can be located along a side (e.g., a bottom side) of the UI 300A. Similar to the main region, the thumbnail region is also associated with a video stream received from the client device and displays the video stream. However, the thumbnail region spans a smaller area than the main region, thereby presenting images of the associated video stream in a relatively smaller scale than the main region.

In some embodiments, the first region 316 is relatively bigger than the second region 318 and the third region 320 to catch the attention of participants in the video conference (e.g., users of the client devices).

In some embodiments, there can be more than one main region. In some embodiments, each region is of the same or similar size as the size of each other region. In some embodiments, the first region 316 can be used to display a video stream from a client device associated with an active and/or current speaker and/or presenter of the video conference.

In some embodiments, the video content manager 122 can associate each region with a visual item corresponding to a video stream received from a client device. For example, the processing device can determine that the second region 318 is to display a visual item corresponding to a video stream from the client device of Participant A (e.g., based on an identifier associated with each client device and/or each participant). In some embodiments, this can be done automatically without any user input specifying which visual item is to be displayed in the second region 318 in the UI 300A.

In some embodiments, the UI 300 can also include an options region (not illustrated) for providing selectable options (e.g., UI elements) to adjust display settings (e.g., a size of each region, a number of regions, a selection of a video stream, etc.), invite additional users to participate, active a virtual whiteboard UI element, etc. In some embodiments, the UI 300 can also include an options region (not illustrated) for providing selectable options to adjust display settings (e.g., a size of each region, a number of regions, a selection of a video stream, etc.), invite additional users to participate, etc.

In some embodiments, video content manager 122 can identify an event associated with a client device of the multiple client devices of participants of the video conference. The first event can indicate a request to present content in UI 300. Content can refer to digital data that can be rendered for display. In some embodiments, the content includes content of a document of a document application. In some embodiments, responsive to identifying an event indicative of a request to present content in the UI 300, video content manager 122 can generated a composite video segment and provide the composite video segment as a real-time video stream for presentation within UI 300. In some embodiments, the composite video segment can include video of the participant and the content for presentation in a region of the UI 300.

In some embodiments, the event can include a selection of a UI element (not shown) of UI 300A that requests the presentation of content in the UI 300. In some embodiments, the event can include a user input, such as a keyboard input, touch pad input, or mouse input that requests the presentation of content in UI 300. In some embodiments, the event can include a voice command requesting presentation of content in UI 300.

In some embodiments, the event can include a video gesture that is detected by video content manager 122. A video gesture can refer to a physical movement, action, or physical orientation made by a person or character that is captured on video. For example, video content manager 122 can perform a computer vision operation on a video segment on the video stream of participant N to detect a video gesture that qualifies as a predetermined video gesture indicative of a request to present content in UI 300. In some embodiments, video gesture detection can include detecting the movement of an object (e.g., predetermined object), such as the user's finger, stylus, or pen.

For example, participant N uses an object, such as the user's finger to indicate that participant N is requesting to present content in UI 300. For example, participant N makes a particular hand gesture to request to present content in UI 300. Video content manager 122 can receive a video segment of the video stream of participant N that includes the hand gesture. Video content manager 122 can perform a computer vision operation on the video gesture to determine whether the video gesture qualifies as a predetermined video gesture that corresponds with a request to present content in UI 300. If the video content manager 122 determines that the video gesture qualifies as the predetermined video gesture, video content manager 122 can provide the content for display in UI 300, as described herein. If video content manager 122 determines that the video gesture does not qualify as the predetermined video gesture, video content manager 122 does not present content and continues to present the visual item corresponding to a video stream from the client device of Participant N.

A computer vision operation can include one or more operations that interpret visual data (e.g., video data such as a video segment including multiple frames). In some embodiments, a computer vision operation can include using the visual data, such a video segment of a video stream, to identify and classify objects in the image or video. In some embodiments, a computer vision operation can identify and interpret human gestures using the visual data. The gestures can include hand gestures, body movement, facial expression or other physical actions made by humans. In some embodiments, the computer vision operation can detect changes between frames of a video segment. In some embodiments, machine learning techniques such as machine learning models trained on training data that pairs inputs within known outputs is implemented to perform a computer vision operation for gesture recognition.

In some embodiments, the computer vision operation to detect an event can include an optimization operation. In some embodiments, performing a computer vision operation on all the frames of a video segment to detect an event can use a large amount of computer resources (e.g., memory resources or computational resources). In some embodiments, the computer vision operation to detect an event can include sampling a subset of frames of the video segment (e.g., sampling the frames below the frame rate, such as 1 out of 3 frames or 1 out of 10 frames) and performing the computer vision operation on the subset of frames to reduce the computer resources used to identify an event.

In some embodiments, the optimization operation of the computer vision operation can use lower resolution frames (e.g., lower than received from the client device) in detecting the event. In some embodiments, the optimization operation of the computer vision operation also includes performing the computer vision operation only on a predetermined object (e.g., the user's hands) and excluding the remaining content of the video frames from analysis. In some embodiments, one or more the optimization operations, as described herein, can be combined.

Figure 3B:
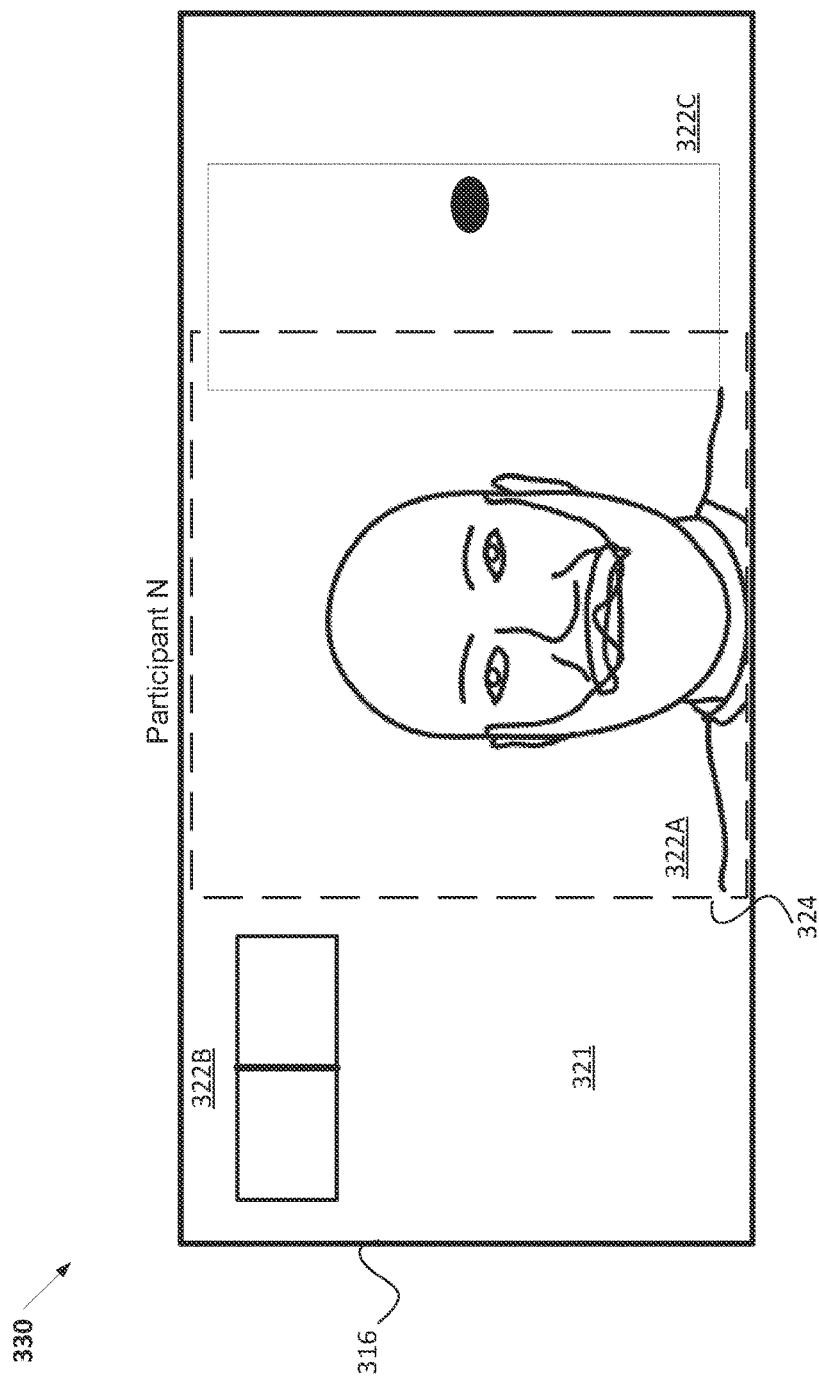
FIG. 3B illustrates an example frame of a video segment used to generate a composite video segment, in accordance with some embodiments of the disclosure.

FIG. 3B illustrates an example frame of a video segment used to generate a composite video segment, in accordance with some embodiments of the disclosure.

Frame 330 illustrates a frame from a video segment received from the client device of Participant N. The frame 330 shows the frame that is displayed in region 316 of UI 300A of FIG. 3A.

In some embodiments, to generate a composite video segment based on a video segment received from a client device, such as the client device of Participant N, video content manager 122 generates a first video layer of multiple layers of the composite video segment. The video layer can include video of a participant, such as participant N. To generate the video layer, video content manager 122 crops a visual representation of the participant from frames of the video segment received from the client device of Participant N.

For example, frame 330 shows the cropped portion 324 of frame 330 within a cropping boundary illustrated within dashed lines. As illustrated and in some embodiments, the visual representation of the participant N and some background (e.g., a portion of video object 322C) are within the cropped portion 324. In some embodiments, an outline of the visual representation of the Participant N can be cropped from frame 330 using a cropping boundary (not illustrated). It can be noted that although a single frame is illustrated, the operation (e.g., cropping operation) can be performed on multiple frames, and generally all the frames, for a video segment.

Figure 3C:
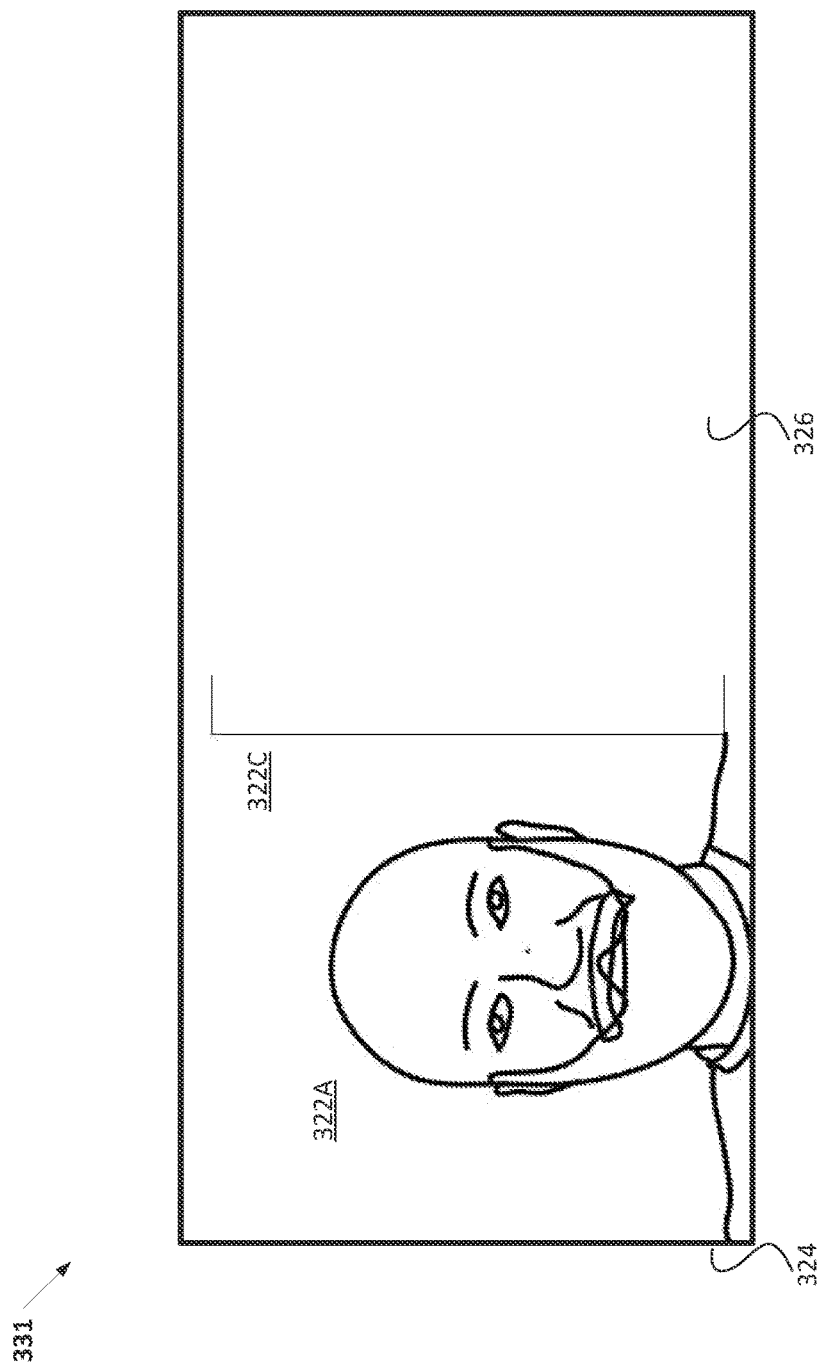
FIG. 3C illustrates an example frame of a video layer used to generate a composite video segment, in accordance with some embodiments of the disclosure.

FIG. 3C illustrates an example frame of a video layer used to generate a composite video segment, in accordance with some embodiments of the disclosure.

Frame 331 illustrates a frame of a video layer used to generate a composite video segment. In some embodiments, to generate the video layer, the visual representation of the participant can be reframed in a new frame (or video layer). In some embodiments, the visual representation of the participant is reframed to allow an area 326 for presentation of the requested content (e.g., document). In some embodiments, to reframe the visual representation of the participant, video content manager 122 modifies the location of the cropped portion 324 that includes the visual representation of the participant in the video layer (e.g., frames of the video layer) relative to the location of the cropped portion 324 in the first video segment. For example, in the original frame (i.e., frame 330 of FIG. 3B), the visual representation of the Participant N is located in approximately the center of frame 330. In the frame 331 of the video layer, the visual representation of Participant N is moved to one side of the frame 331. In some embodiments, the video layer is generated such that the area of the frame that includes the visual representation for the participant is within a specified ratio of the total frame area. For example, the area of the frame that includes the participant can be approximately ⅓ of the entire area of frame 331.

In some embodiments, additional processing can be performed on the cropped portion 324 of the original frame (e.g., video segment). For example, color enhancement or size adjustments can be performed on the cropped portion of the original frame of the video segment.

In some embodiments, video content manager 122 can move the cropped portion 324 to either of the lateral sides of the frame 331 of the video layer. In some embodiments, the lateral side of the frame 331 to which the cropped portion 324 is moved can be based on one or more criteria. In some embodiments, the cropped portion 324 can be placed on a particular lateral side based on the whether the presentation of the content is enhanced on a particular lateral side relative to the opposite lateral side. For example, video content manager 122 can identify a video object(s) (e.g., shelving) in the background (e.g., background layer) that obstructs the visibility of the content on one lateral side but not the opposite lateral side. Video content manager 122 can place the cropped portion 324 on the opposite lateral side based on the determination. In some embodiments, the cropped portion 324 can be placed on a particular lateral side based on the handedness of the participant (e.g., participant N). For example, if the participant is left handed, the cropped portion can be placed left lateral side so the user's hand (e.g., visual representation thereof) is adjacent to the content in the composite video segment. In some embodiments, the cropped portion 324 can be placed on a particular lateral side based on a user preference.

It can be noted that although a single frame is illustrated, the operation (e.g., reframing operation) can be performed on multiple frames, and generally all the frames, of a video segment to form a video layer of the composite video segment.

Figure 3D:
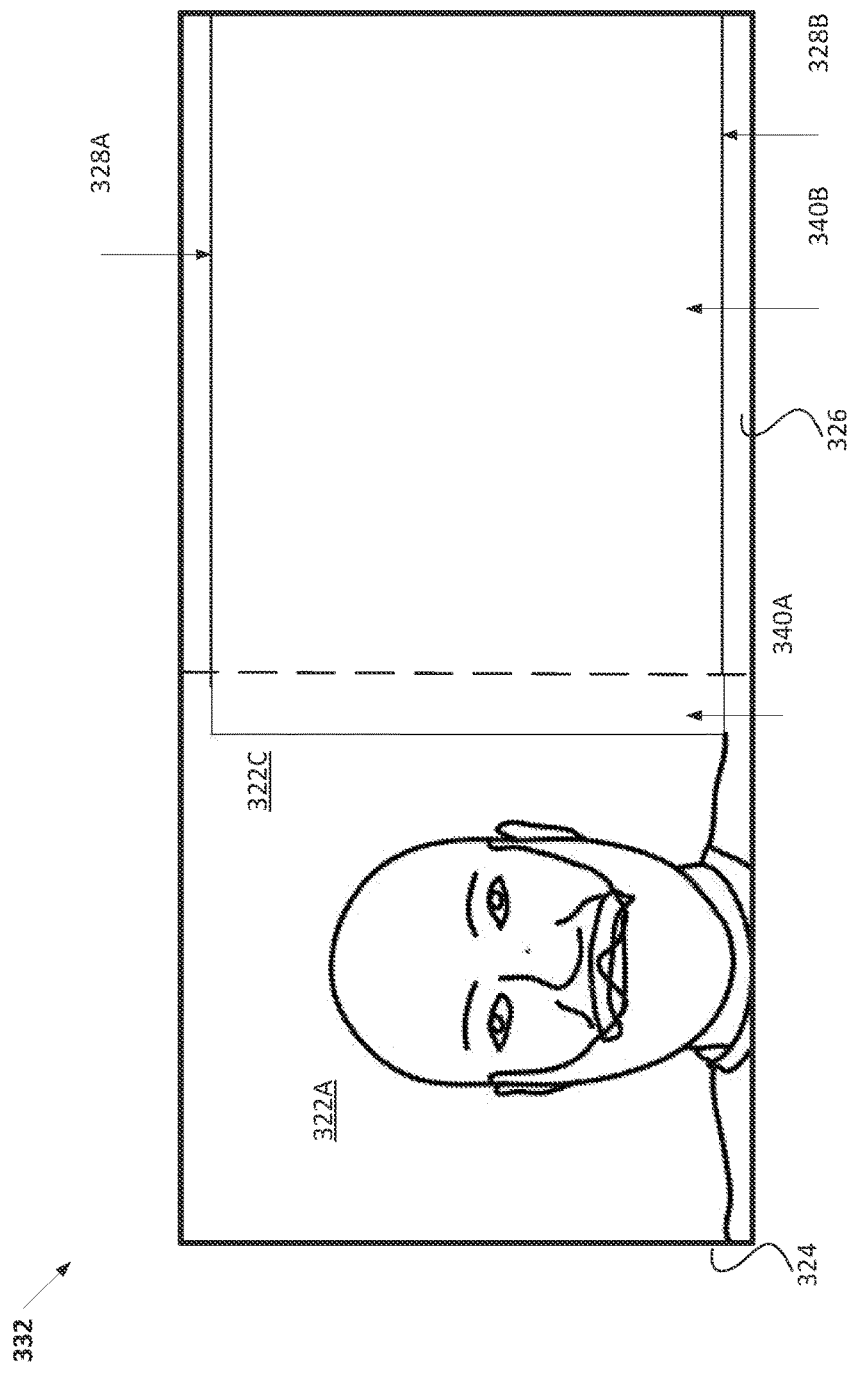
FIG. 3D illustrates an example frame of a background layer used to generate a composite video segment, in accordance with some embodiments of the disclosure.

FIG. 3D illustrates an example frame of a background layer used to generate a composite video segment, in accordance with some embodiments of the disclosure.

Frame 332 illustrates a generation of a frame for a background layer of the composite video segment. In some embodiments, to generate the composite video segment based on the video segment received from the client device, video content manager 122 can generate a background layer that is different than the original background of the first video segment, as illustrated. For example, in area 326 video object 328A and video object 328B (generally referred to as "video object(s) 328) have been generated.

In some embodiments, to generate the background layer, video content manager 122 can analyze features of the original background 340A and generate an additional background portion 340B based on the analysis of features of the original background 304A. In some embodiments, the analysis of features of the original background 340A can be an analysis of any features of the entirety of the original background 304A. In some embodiments, the analysis of features of the original background 340A can be an analysis of the portion of the original background 340A that is part of the cropped portion 324 of the original background 304A. Video content manager 122 can merge a portion of the original background 340A with the additional background portion 304B to form the background layer. For purposes of clarity, the dashed line illustrates the delineation between the portion of the original background 340A and the portion of the additional background but does not form part of the frame 332.

For example, the cropped portion 324 includes a part of video object 322C (e.g., part of the door). Video content manager 122 can analyze the original background 340A in cropped portion 324 and generate features that match the original background 340A. In the current example, the outline of the door is extended to maintain continuity of the visual appearance of the background and provide a background that can enhance the display of content presented there above. In some embodiments, video content manager 122 can fill the additional background portion 340B with features that are similar in one or more texture, lighting, and or color to the features in the original background 340A to form a unified and cohesive background layer.

In some embodiments, to generate the additional background portion 340B, video content manager 122 can implement a background fill operation. To implement a background fill operation, video content manager 122 can divide the original background 340A into smaller parts and analyze one or more of the texture, color, lighting or patterns in each part. Video content manager 122 can identify other parts of the original background 340A with similar textures, colors, lighting and/or patterns. The video content manager 122 can use the texture, color, lighting and/or pattern information of each part and the similarity between parts to fill the additional background portion 340B with one or more textures, colors, lighting or patterns. In some embodiments, the content fill operation can be implemented using a machine learning model that is trained using datasets of frames with various textures, patterns, lighting and colors. The machine learning model can be trained using an input and output pair (e.g., feature and label).

In some embodiments, the additional background portion 340B can be extended from the original background 340A. For example, features of the original background can be copied and extended into the additional background portion 340B.

In some embodiments, to generate the background layer, video content manager 122 can perform a pixel blur operation on at least the additional background portion 340B of the background layer. In some embodiments, the pixel blur operation blurs at least areas of the first background layer above which the first part of the content is composited. The pixel blur operation can make pixels in an area of the background layer less sharp and defined when displayed. The pixel blur operation can help improve the contrast between the overlaid content and the background layer.

In some embodiments, the background layer can include no elements of the original background 340A. For example, the background layer could be entirely of a single color or a static image.

Although the frame 332 of the background layer is illustrated with video objects of the video layer, in other embodiments different implementations are possible. For example and in some embodiments, the video object 322A that includes the participant can be excluded from the frame 332 of the background layer.

It can be noted that although a single frame is illustrated, the operation (e.g., background layer operation) can be performed on multiple frames, and generally all the frames, of a video segment to form a background layer of the composite video segment.

Figure 3E:
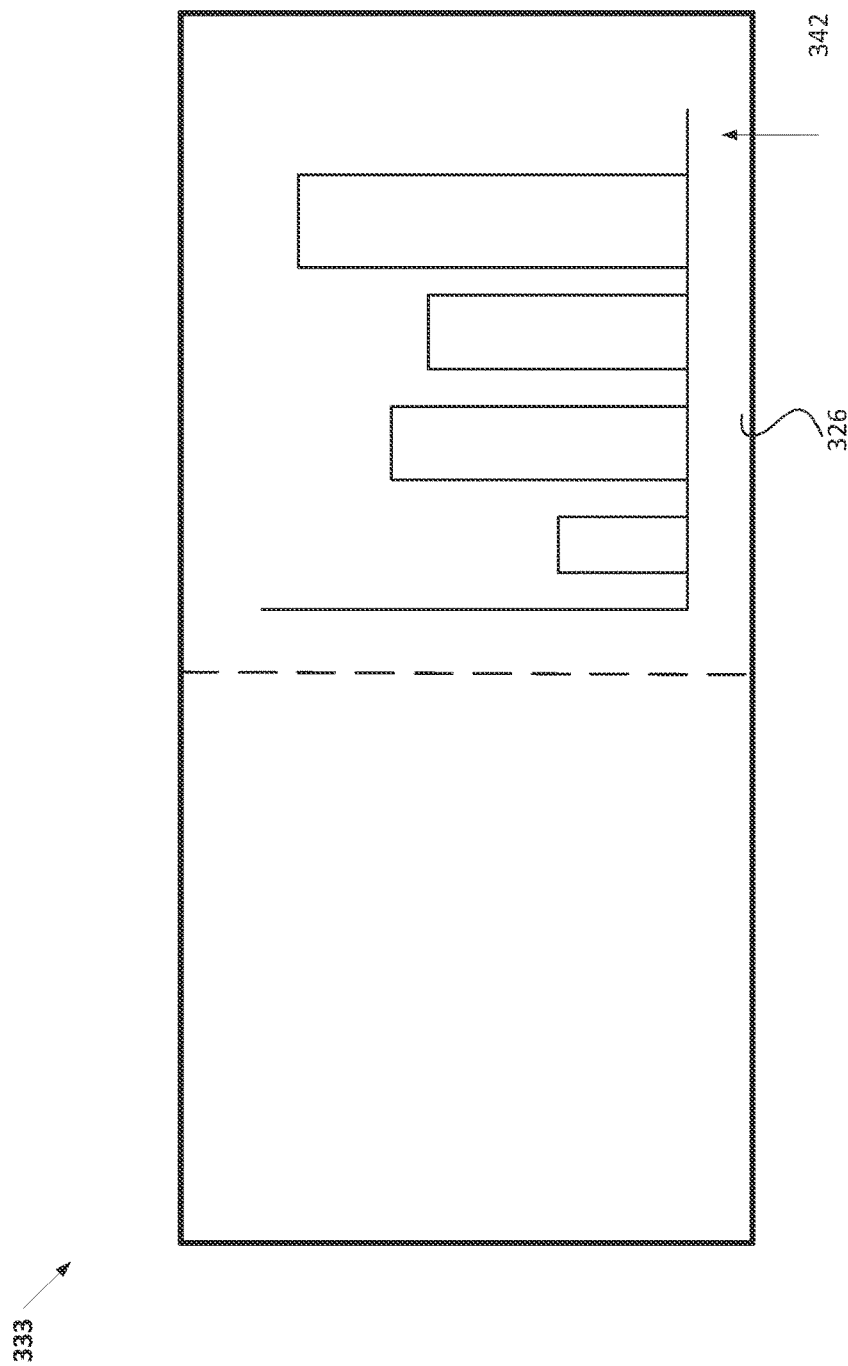
FIG. 3E illustrates an example frame of a content layer used to generate a composite video segment, in accordance with some embodiments of the disclosure.

FIG. 3E illustrates an example frame of a content layer used to generate a composite video segment, in accordance with some embodiments of the disclosure.

Frame 333 illustrates a generation of a frame for a content layer of the composite video segment. In some embodiments, to generate the composite video segment based on the video segment received from the client device, video content manager 122 generates a content layer that include at least a part of the content 342.

As illustrated the content 342 is positioned in an area 326 of frame 333 that is designated for the presentation of content, in accordance with some embodiments. Frame 333 illustrates a slide containing an image of graph. The slide can be part of a larger slide presentation.

In some embodiments, video content manager 122 can receive from the client device of the participant (e.g., Participant N) data (e.g., video data) identifying at least part of the content that is displayed at the client device. Video content manager 122 can generate the content layer that includes at least part of the content using the received video data.

For example, Participant N can open a document at the client device. The document can be displayed at the client device and a video stream (e.g., screen share) can be implemented that sends a video stream of the document to video content manager 122. Video content manager 122 can process the video stream and generate the video layer using the content in the video stream.

In some embodiments, video content manager 122 can receive from the client device of participant a data file (e.g., document file of a document application) in a first format. The data file can identify the content for display. Video content manager 122 can encode the content in the first format to a second format that is compatible with generating a video layer. Video content manager 122 can generate the content layer using the content in the second format.

For example, video content manager 122 can open the document using the corresponding document application and extract the content from the document in the first format (e.g., text). Video content manager 122 can encode the content into a second format (e.g., image) that is compatible with the video layer.

In some embodiments, the content received from the client device can be modified (e.g., enhanced) to improve the presentation of the content. In some embodiments, features of the content can be adjusted to increase contrast between the content and the background layer. In some embodiments, the color of the content can be adjusted, for example, to increase the contrast between the background layer (e.g., additional background portion) and the content. In some embodiments, the content 342 can be implemented with a glow or shadow effect to increase the contrast between the background layer (e.g., additional background portion) and the content.

Figure 3F:
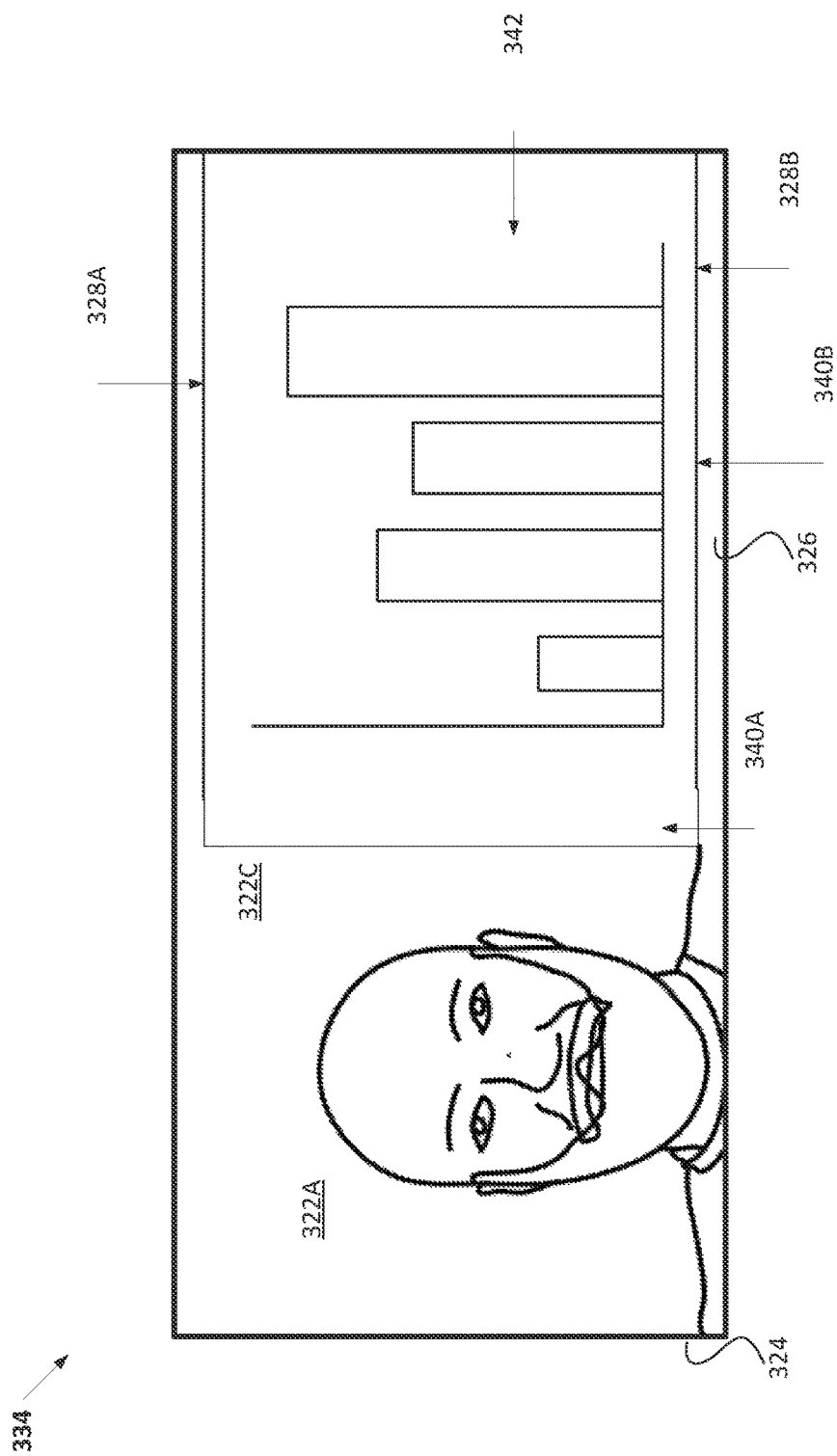
FIG. 3F illustrates an example frame of a composited layer of a composite video segment, in accordance with some embodiments of the disclosure.

FIG. 3F illustrates an example frame of a composited layer of a composite video segment, in accordance with some embodiments of the disclosure. Frame 334 of a composited layer of a composite video segment illustrates the multiple layers merged to form a single and unified frame of the composite video segment. Frame 334 includes frame 331 of the video layer that includes cropped portion 324 the includes a visual representation of Participant N, frame 332 of the background layer that includes video object 322C, 328A and 328B, and frame 333 that included content 342.

It can be noted that although a single frame is illustrated, the operation (e.g., compositing operation) can be performed on multiple frames, and generally all the frames, of multiple layers to form the composite video segment.

Figure 3G:
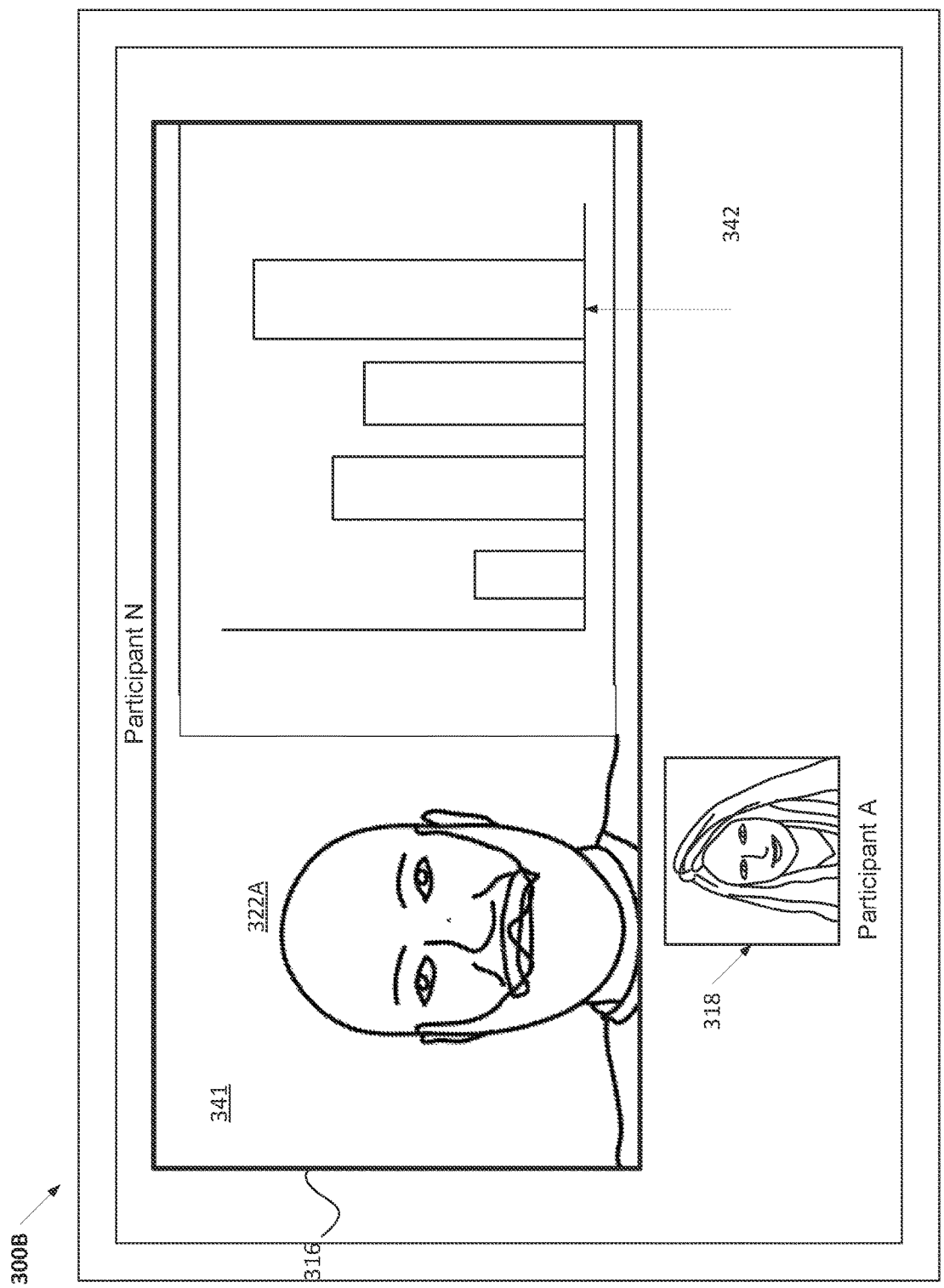
FIG. 3G illustrates an example user interface having a composite video segment for a video conference, in accordance with some embodiments of the disclosure.

FIG. 3G illustrates an example user interface 300B having a composite video segment for a video conference, in accordance with some embodiments of the disclosure.

UI 300B can include multiple regions, such as a first region 316, a second region 318. Second region 318 can display a visual item corresponding to video data captured and/or streamed by a client device associated with Participant A. The first region 316 can display the composite video segment as described herein and illustrated in FIG. 3F. The first region 316 can include a visual item 341 corresponding to video data captured and/or streamed by a client device associated with Participant N and content 342 (e.g., at least part of a document). As illustrated, visual item 321 includes the video stream of participant N and a slide of a slide presentation. In some embodiments, video content manager 122 provides the composite video segment as a real-time video stream for presentation within respective regions of respective instances of UI 300B at the client devices of the participants of the video conference.

Figure 3H:
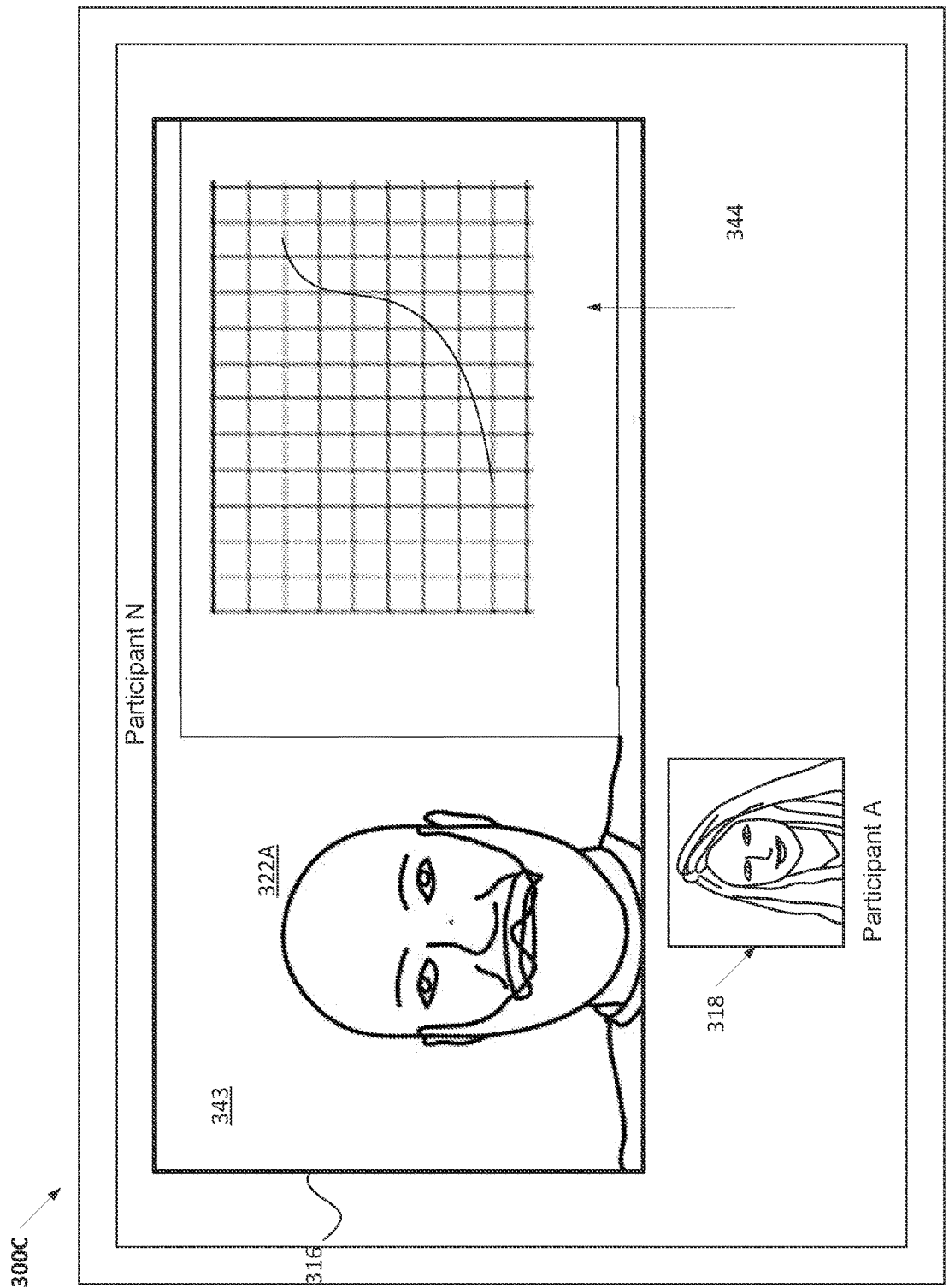
FIG. 3H illustrates an example user interface having a composite video segment for a video conference, in accordance with some embodiments of the disclosure.

FIG. 3H illustrates an example user interface 300C having a composite video segment for a video conference, in accordance with some embodiments of the disclosure.

UI 300C can include multiple regions, such as a first region 316, a second region 318. Second region 318 can display a visual item corresponding to video data captured and/or streamed by a client device associated with Participant A. First region 316 can include a visual item 343 corresponding to video data captured and/or streamed by a client device associated with Participant N and content 344 (e.g., a different part of a document). As illustrated, visual item 343 includes the video stream of participant N and a different slide of (different than content 342 of FIG. 3G) a slide presentation.

In some embodiments, video content manager 122 provides the composite video segment as a real-time video stream for presentation within respective regions of respective instances of UI 300C at the client devices of the participants of the video conference.

In some embodiments, video content manager 122 identifies an event associated with the client device of Participant N requesting to present a second part of the content. Events are further described above at least with respect to FIG. 3A. Responsive to identifying the event, video content manager 122 can generate a composite video segment based on the video segment received from the client device of Participant N. Video content manager 122 can generate a video layer by reframing the Participant N and generate the content layer that includes the second part of the content. In some embodiments, video content manager 122 can generate a background layer. In some embodiments, video content manager 122 composites the multiple layers to generate the composite video segment.

For example, the Participant N can use a user input or video gesture to advance to a next slide of the slide presentation. In another example, the Participant can use a user input or video gesture to scroll a specified direction such that the second part of the content 344 is presented.

FIG. 3I illustrates an example user interface 300D having a composite video segment for a video conference, in accordance with some embodiments of the disclosure.

UI 300D illustrates a new composite video segment that was generated by a relocation of the user within in the respective video steam. In some embodiments, video content manager 122 can detect an event associated with a client device of Participant N that indicates a relocation of Participant N in the Participant N's video stream sent from Participant N's client device. For example, the Participant N can move towards Participant N's left. Video content manager 122 can identify the particular event (e.g., identify the video gesture) and generate a new composite video segment that positions the Participant N (e.g., video object 322A) on the opposite lateral side of the video segment. Similarly, the content 344 can be positioned to the remaining lateral side of the video segment. Video object 346 illustrates a background video object that has been generated (e.g., additional background portion) using the original background video object (e.g., video object 322B of FIG. 3A).

Figure 3J:
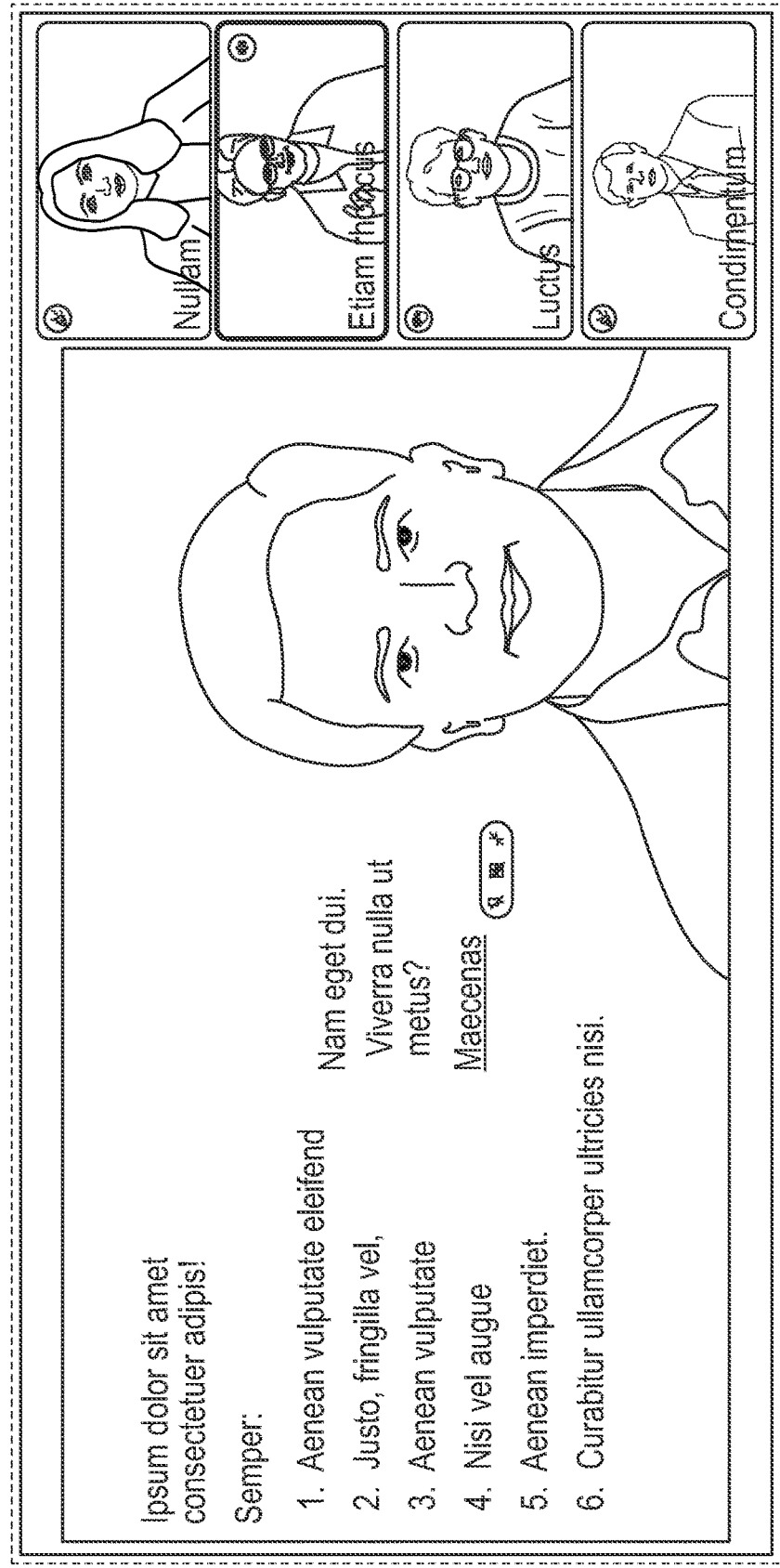
FIG. 3J illustrates an example user interface having a composite video segment for a video conference, in accordance with some embodiments of the disclosure.

FIG. 3J illustrates an example user interface 300J having a composite video segment for a video conference, in accordance with some embodiments of the disclosure.

UI 300J illustrates an example composite video segment in region 446. The composite video segment includes content shown on the left lateral side of the region 446 and video of the participant is shown on the right lateral side of the region. The content is illustrated above the background layer. Other regions of the UI 300J are shown on the right side of the UI 300J and show video streams associated with other participants of the video conference.

Figure 4:
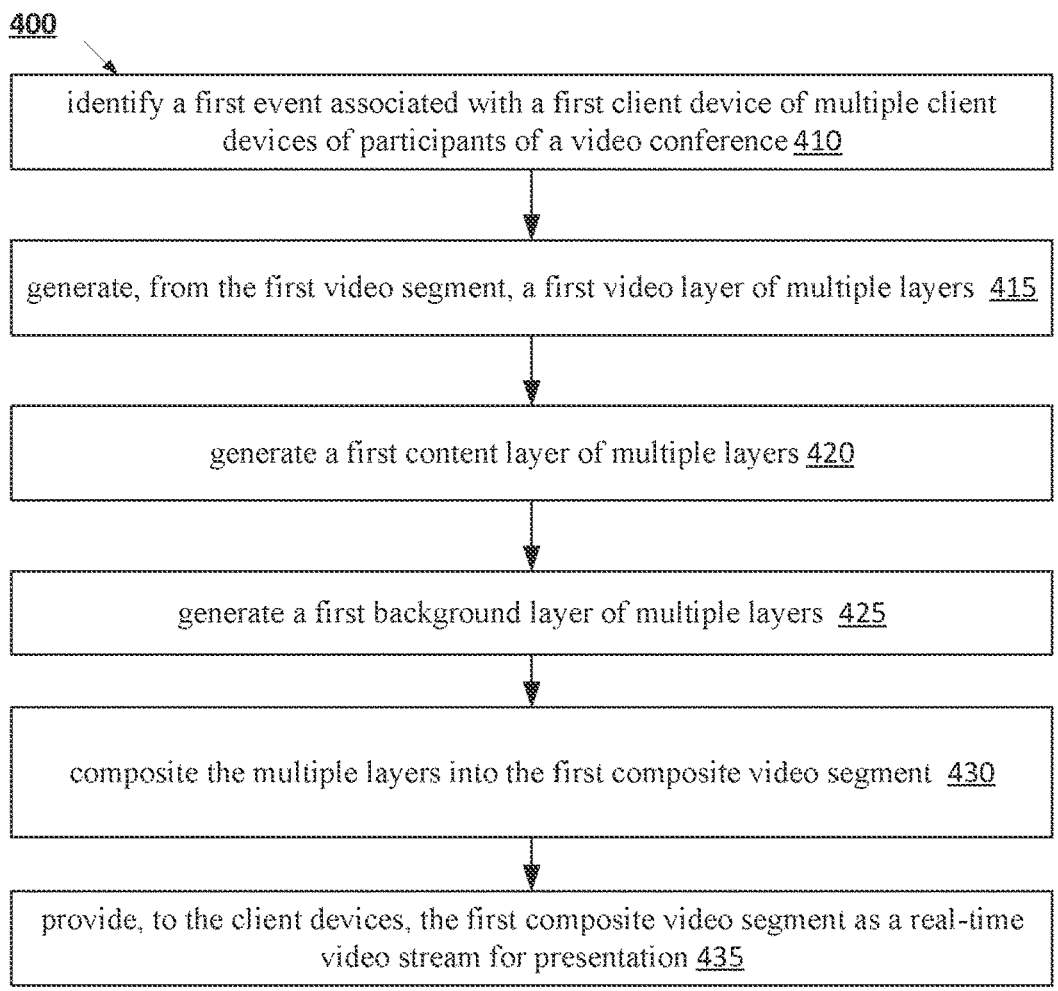
FIG. 4 depicts a flow diagram of a method for implementing a composite video segment for presentation in a user interface (UI) of a video conference, in accordance with embodiments of the disclosure.

FIG. 4 depicts a flow diagram of a method 400 for implementing a composite video segment for presentation in a user interface (UI) of a video conference, in accordance with embodiments of the disclosure. Method 400 may be performed by processing logic that may include hardware (circuitry, dedicated logic, etc.), software (e.g., instructions run on a processing device), or a combination thereof. In one embodiment, some or all the operations of method 400 may be performed by one or more components of system 100 of FIG. 1 (e.g., video conference platform 120, server 130 and/or video content manager 122).

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 410, the processing logic identifies a first event associated with a first client device of multiple client devices of participants of a video conference. In some embodiments, the first event indicates a request to present content in a user interface (UI) that includes regions that display visual items each corresponding to one of the video streams from the client devices.

In some embodiments, to identify the first event associated with the first client device of the multiple client devices of the participants of the video conference, processing logic receives, from the first client device, a first video segment of a first video stream of the multiple video streams. In some embodiments, processing logic can perform a first computer vision operation on the first video segment to detect a video gesture that qualifies as a predetermined video gesture indicative of the request to present content in the UI.

In some embodiments, to perform the first computer vision operation on the first video segment to detect the video gesture that qualifies as the predetermined video gesture indicative of the request to present content in the UI, processing logic samples a subset of frames of the first video segment. In some embodiments, processing logic performs the first computer vision operation on the subset of frames of the first video segment.

In some embodiments, to identify the first event associated with the first client device of the multiple client devices of the participants of the video conference, processing logic receives an indication of a user selection of a UI element of the UI that indicates the request to present content in the UI.

In some embodiments, processing logic can generate a composite video segment based on the first video segment received from the first client device. Generating the first composite video segment can include one or more of the following operations in some embodiments.

At operation 415, processing logic generates, from the first video segment, a first video layer of multiple layers. In some embodiments, processing logic generates the first video layer by reframing a first participant corresponding to the first client device.

In some embodiments, to generate, from the first video segment, the first video layer of the multiple layers, processing logic crops a visual representation of the first participant from first frames of the first video segment. In some embodiments, reframing the first participant includes modifying a location of the cropped visual representation of first participant in the first video layer relative to a location of the first participant in the first video segment.

At operation 420, processing logic generates a first content layer of the multiple layers. In some embodiments, the first content layer includes at least a first part of the content.

In some embodiments, processing logic adjusts features of the first part of the content to increase contrast between the first part of the content and the first background layer.

In some embodiments, to generate the first content layer, processing logic receives, from the first client device, data identifying the first part of the content displayed at the first client device. In some embodiments, processing logic generates the first content layer including the first part of the content using the data.

In some embodiments, to generate the first content layer, processing logic receives, from the first client device, a first data file in a first format. The first data file identifies the content. In some embodiments, processing logic encodes the content from the first format to a second format. In some embodiments, processing logic generates the first content layer using the first part of the content in the second format.

At operation 425, processing logic generates a first background layer of the multiple layers. In some embodiments, the first background layer is different than an original background of the first video segment.

In some embodiments, to generate the first background layer of the multiple layers, processing logic analyzes features of the original background. In some embodiments, processing logic generates an additional background portion based on the analysis of the features. In some embodiments, processing logic merges a portion of the original background with the additional background portion to form the background layer.

In some embodiments, to generate the first background layer of the multiple layers, processing logic performs a pixel blur operation on at least the additional background portion of the first background layer. In some embodiments, the pixel blur operation blurs areas of the first background layer above which the first part of the content is to be presented.

At operation 430, processing logic composites the multiple layers into the first composite video segment. In some embodiments, in the composite video segment the reframed visual representation of the first participant is positioned adjacent to the first part of the content.

At operation 435, processing logic providing, to the client devices, the first composite video segment as a real-time video stream. In some embodiments, the real-time video stream is provided for presentation within respective regions of the multiple regions of respective instances of the UI.

In some embodiments, processing logic identifies a second event associated with the first client device of the multiple client devices of the participants of the video conference. The second event can indicate a relocation of the first participant in a first video stream of the plurality of video streams. In some embodiments, the second event can be a video gesture that is detected by a computer vision operation as described herein. In some embodiments, responsive to identifying the second event, processing logic generates a second composite video segment based on a second video segment received from the first client device. In some embodiments, generating the second composite video segment includes generating, from the second video segment, a second video layer by reframing the first participant. In some embodiments, processing logic generates a second content layer that includes the first part of the content. In some embodiments, processing logic generates a second background layer that is different than the first background layer. In some embodiments, processing logic processing logic composites two or more of the second video layer, the second content layer and the second background layer into the second composite video segment. In some embodiments, processing logic provides, to the client devices, the second composite video segment as the real-time video stream for presentation within the respective regions of the multiple regions of the respective instances of the UI.

In some embodiments, processing logic identifies a third event associated with the first client device of the multiple client devices of the participants of the video conference. The third event indicating a request to present a second part of the content. In some embodiments, the third event can be a video gesture that is detected by a computer vision operation as described herein.

In some embodiments, responsive to identifying the third event, processing logic generates a third composite video segment based on a third video segment received from the first client device. In some embodiments, generating the third composite video segment includes generating, from the third video segment, a third video layer by reframing the first participant. In some embodiments, processing logic generates a third content layer that includes the second part of the content. In some embodiments, processing logic generates a third background layer. In some embodiments, processing logic composites at least two of the third video layer, the third background layer and the third content layer into the third composite video segment in which the reframed visual representation of the first participant is positioned adjacent to the second part of the content. In some embodiments, processing logic provides, to the client devices, the third composite video segment as the real-time video stream for presentation within the respective regions of the multiple regions of the respective instances of the UI.

Figure 5:
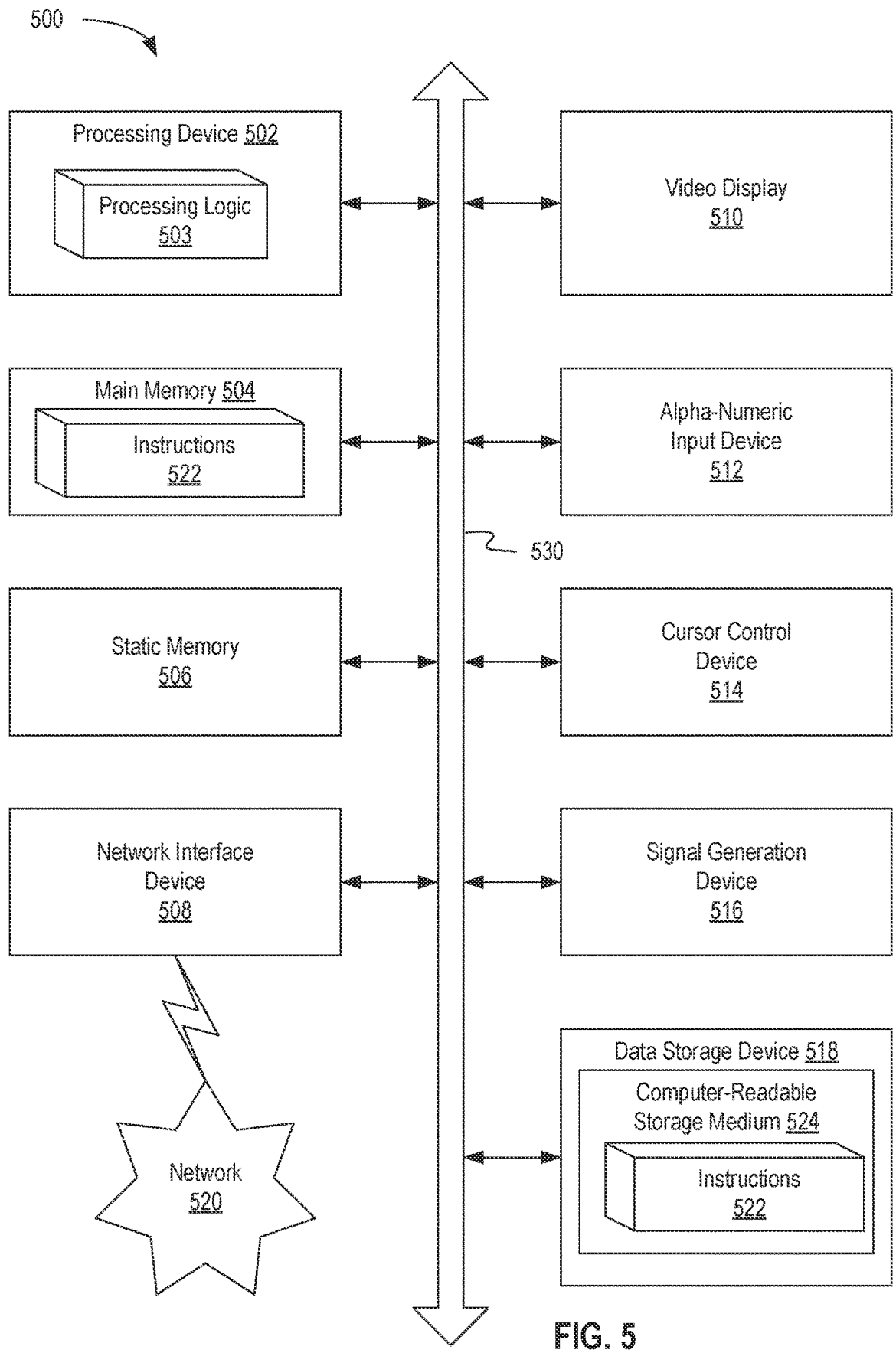
FIG. 5 depicts an example computer system that can perform any one or more of the methods described herein, in accordance with some embodiments of the disclosure.

FIG. 5 depicts an example computer system 500 that can perform any one or more of the methods described herein, in accordance with some embodiments of the disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 (which can include processing logic 503 implementing video content manager 122) represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for implementing video content manager 122.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). In one illustrative example, the video display unit 510, the alphanumeric input device 512, and the cursor control device 514 may be combined into a single component or device (e.g., an LCD touch screen).

The data storage device 518 may include a computer-readable storage medium 524 on which is stored the instructions 522 implementing video content manager 122 and/or embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable media. In some embodiments, the instructions 522 may further be transmitted or received over a network 520 via the network interface device 508.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operations may be performed, at least in part, concurrently with other operations. In certain embodiments, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the disclosure may be practiced without these specific details. In some instances, well-known structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description. In addition, aspects of the disclosure are not described with reference to any particular programming language. It will be appreciated that a variety of programming languages may be used to implement the teachings of the disclosure as described herein.

Aspects of the disclosure may be provided as a computer program product, or software, which may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

Finally, embodiments described herein include collection of data describing a user and/or activities of a user. In one embodiment, such data is only collected upon the user providing consent to the collection of this data. In some embodiments, a user is prompted to explicitly allow data collection. Further, the user may opt-in or opt-out of participating in such data collection activities. In one embodiment, the collect data is anonymized prior to performing any analysis to obtain any statistical patterns so that the identity of the user cannot be determined from the collected data.

What is claimed is:

1. A method comprising:

identifying a first event associated with a first client device of a plurality of client devices of a plurality of participants of a video conference, the first event indicating a request to present content in a user interface (UI) comprising a plurality of regions each corresponding to one of a plurality of video streams from the plurality of client devices;

responsive to identifying the first event, generating a first composite video segment based on a first video segment of a first video stream from the first client device, wherein generating the first composite video segment comprises:

generating, from the first video segment, a first video layer of a plurality of layers, wherein the first video segment depicts a first participant corresponding to the first client device and an original background, wherein the first video layer comprises a reframed visual representation of the first participant;

generating a first background layer of the plurality of layers, the first background layer comprising an additional background portion generated based on a portion of the original background of the first video segment;
generating a first content layer of the plurality of layers, the first content layer comprising a first part of the content; and
compositing the first video layer, the first background layer and the first content layer into the first composite video segment in which i) the reframed visual representation of the first participant is positioned adjacent to the first part of the content and ii) at least part of the additional background portion of the first background layer is positioned behind and extends beyond the first content layer; and
providing, to the plurality of client devices, the first composite video segment as a real-time video stream for presentation within respective regions of the plurality of regions of respective instances of the UI.

2. The method of claim 1, wherein generating, from the first video segment, the first video layer of the plurality of layers, further comprises:
cropping a visual representation of the first participant from first frames of the first video segment; and
reframing the visual representation of the first participant to generate the reframed visual representation of the first participant, wherein reframing the visual representation of the first participant comprises modifying a location of the cropped visual representation of the first participant in the first video layer relative to a location of the visual representation of the first participant in the first video segment.

3. The method of claim 1, wherein the first background layer is different than the original background of the first video segment.

4. The method of claim 3, wherein generating the first background layer of the plurality of layers, comprises:
analyzing features of the original background;
generating the additional background portion based on the analysis of the features; and
merging the portion of the original background with the additional background portion.

5. The method of claim 4, wherein generating the first background layer of the plurality of layers, further comprises:
performing a pixel blur operation on at least the additional background portion of the first background layer, the pixel blur operation to blur areas of the first background layer above which the first part of the content is composited.

6. The method of claim 3, further comprising:
adjusting features of the first part of the content to increase contrast between the first part of the content and the first background layer.

7. The method of claim 1, wherein generating the first content layer, comprises:
receiving, from the first client device, data identifying the first part of the content displayed at the first client device; and
generating the first content layer including the first part of the content using the data.

8. The method of claim 1, wherein generating the first content layer, comprises:
receiving, from the first client device, a first data file in a first format, the first data file comprising the content;
encoding the content from the first format to a second format; and
generating the first content layer using the first part of the content in the second format.

9. The method of claim 3, further comprising:
identifying a second event associated with the first client device of the plurality of client devices of the plurality of participants of the video conference, the second event indicating a relocation of a visual representation of the first participant in the first video stream of the plurality of video streams;
responsive to identifying the second event, generating a second composite video segment based on a second video segment received from the first client device, wherein generating the second composite video segment comprises:
generating, from the second video segment, a second video layer comprising a second reframed visual representation of the first participant;
generating a second content layer comprising the first part of the content;
generating a second background layer that is different than the first background layer; and
compositing the second video layer, the second content layer and the second background layer into the second composite video segment; and
providing, to the plurality of client devices, the second composite video segment as the real-time video stream for presentation within the respective regions of the plurality of regions of the respective instances of the UI.

10. The method of claim 1, further comprising:
identifying a third event associated with the first client device of the plurality of client devices of the plurality of participants of the video conference, the third event indicating a request to present a second part of the content;
responsive to identifying the third event, generating a third composite video segment based on a third video segment received from the first client device, wherein generating the third composite video segment comprises:
generating, from the third video segment, a third video layer comprising a third reframed visual representation of the first participant;
generating a third content layer comprising the second part of the content; and
compositing the third video layer and the third content layer into the third composite video segment in which the reframed third visual representation of the first participant is positioned adjacent to the second part of the content; and
providing, to the plurality of client devices, the third composite video segment as the real-time video stream for presentation within the respective regions of the plurality of regions of the respective instances of the UI.

11. A system, comprising:
a memory; and
a processing device, coupled to the memory, to perform operations comprising:
identifying a first event associated with a first client device of a plurality of client devices of a plurality of participants of a video conference, the first event indicating a request to present content in a user interface (UI) comprising a plurality of regions each corresponding to one of a plurality of video streams from the plurality of client devices;

responsive to identifying the first event, generating a first composite video segment based on a first video segment of a first video stream from the first client device, wherein generating the first composite video segment comprises:

generating, from the first video segment, a first video layer of a plurality of layers, wherein the first video segment depicts a first participant corresponding to the first client device and an original background, wherein the first video layer comprises a reframed visual representation of the first participant;

generating a first background layer of the plurality of layers, the first background layer comprising an additional background portion generated based on a portion of the original background of the first video segment;

generating a first content layer of the plurality of layers, the first content layer comprising a first part of the content; and compositing the first video layer, the first background layer and the first content layer into the first composite video segment in which i) the reframed visual representation of the first participant is positioned adjacent to the first part of the content and ii) at least part of the additional background portion of the first background layer is positioned behind and extends beyond the first content layer; and providing, to the plurality of client devices, the first composite video segment as a real-time video stream for presentation within respective regions of the plurality of regions of respective instances of the UI.

12. The system of claim 11, wherein generating, from the first video segment, the first video layer of the plurality of layers, further comprises:

cropping a visual representation of the first participant from first frames of the first video segment; and reframing the visual representation of the first participant to generate the reframed visual representation of the first participant, wherein reframing the visual representation of the first participant comprises modifying a location of the cropped visual representation of the first participant in the first video layer relative to a location of the visual representation of the first participant in the first video segment.

13. The system of claim 11, wherein the first background layer is different than the original background of the first video segment.

14. The system of claim 13, wherein generating the first background layer of the plurality of layers, comprises:

analyzing features of the original background;

generating the additional background portion based on the analysis of the features; and merging the portion of the original background with the additional background portion.

15. The system of claim 14, wherein generating the first background layer of the plurality of layers, further comprises:

performing a pixel blur operation on at least the additional background portion of the first background layer, the pixel blur operation to blur areas of the first background layer above which the first part of the content is composited.

16. The system of claim 13, the operations further comprising:

adjusting features of the first part of the content to increase contrast between the first part of the content and the first background layer.

17. The system of claim 11, wherein generating the first content layer, comprises:

receiving, from the first client device, data identifying the first part of the content displayed at the first client device; and generating the first content layer including the first part of the content using the data.

18. The system of claim 11, wherein generating the first content layer, comprises:

receiving, from the first client device, a first data file in a first format, the first data file comprising the content;

encoding the content from the first format to a second format; and generating the first content layer using the first part of the content in the second format.

19. A non-transitory computer-readable medium comprising instructions that, responsive to execution by a processing device, cause the processing device to perform operations comprising:

identifying a first event associated with a first client device of a plurality of client devices of a plurality of participants of a video conference, the first event indicating a request to present content in a user interface (UI) comprising a plurality of regions each corresponding to one of a plurality of video streams from the plurality of client devices;

responsive to identifying the first event, generating a first composite video segment based on a first video segment of a first video stream from the first client device, wherein generating the first composite video segment comprises:

generating, from the first video segment, a first video layer of a plurality of layers, wherein the first video segment depicts a first participant corresponding to the first client device and an original background, wherein the first video layer comprises a reframed visual representation of the first participant corresponding to the first client device;

generating a first background layer of the plurality of layers, the first background layer comprising an additional background portion generated based on a portion of the original background of the first video segment;

generating a first content layer of the plurality of layers, the first content layer comprising a first part of the content; and compositing the first video layer, the first background layer and the first content layer into the first composite video segment in which i) the reframed visual representation of the first participant is positioned adjacent to the first part of the content and ii) at least part of the additional background portion of the first background layer is positioned behind and extends beyond the first content layer; and providing, to the plurality of client devices, the first composite video segment as a real-time video stream for presentation within respective regions of the plurality of regions of respective instances of the UI.

20. The non-transitory computer-readable medium of claim 19, wherein generating, from the first video segment, the first video layer of the plurality of layers, further comprises:

cropping a visual representation of the first participant from first frames of the first video segment; and reframing the visual representation of the first participant to generate the reframed visual representation of the first participant, wherein reframing the visual representation of the first participant comprises modifying a location of the cropped visual representation of the first participant in the first video layer relative to a location of the visual representation of the first participant in the first video segment.

* * * * *